(12) United States Patent
Kousaridas et al.

(10) Patent No.: US 12,218,826 B2
(45) Date of Patent: Feb. 4, 2025

(54) EXECUTING MULTIPATH COMMUNICATION

(71) Applicant: Huawei Technologies Co., Ltd., Shenzhen (CN)

(72) Inventors: Apostolos Kousaridas, Munich (DE); Chan Zhou, Munich (DE); Panagiotis Spapis, Munich (DE); David García Roger, Valencia (ES); Jose Francisco Monserrat, Valencia (ES)

(73) Assignee: Huawei Technologies Co., Ltd., Shenzhen (CN)

( * ) Notice: Subject to any disclaimer, the term of this patent is extended or adjusted under 35 U.S.C. 154(b) by 352 days.

(21) Appl. No.: 17/737,585

(22) Filed: May 5, 2022

(65) Prior Publication Data

US 2022/0263750 A1    Aug. 18, 2022

Related U.S. Application Data

(63) Continuation of application No. PCT/EP2019/080335, filed on Nov. 6, 2019.

(51) Int. Cl.
*H04L 45/24* (2022.01)
*H04L 47/34* (2022.01)

(52) U.S. Cl.
CPC .............. *H04L 45/24* (2013.01); *H04L 47/34* (2013.01)

(58) Field of Classification Search
CPC ......... H04L 45/24; H04L 47/34; H04L 45/34; H04W 40/24
See application file for complete search history.

(56) References Cited

U.S. PATENT DOCUMENTS

2004/0029553 A1   2/2004   Cain
2009/0296704 A1   12/2009  Kim et al.
(Continued)

FOREIGN PATENT DOCUMENTS

EP   3244581 A1       11/2017
JP   2011087091 A     4/2011
(Continued)

OTHER PUBLICATIONS

"NR V2X scenario for PDCP duplication supporting," [online] 3GPP TSG-RAN WG2 Meeting #105, R2-1901111, Athens, Greece, Total 3 pages, 3rd Generation Partnership Project, Valbonne, France (Feb. 25-Mar. 1, 2019).
(Continued)

*Primary Examiner* — Donald L Mills
(74) *Attorney, Agent, or Firm* — Leydig, Voit & Mayer, Ltd.

(57) ABSTRACT

A method for executing multipath communication at a target communication device includes obtaining, from a source communication device, data packets via two or more different paths, where a header of each data packet includes packet information, which is indicative of an association among the plurality of data packets. The packet information in each data packet at a source communication device is the same as packet information in each data packet at a target communication device irrespective of different radio access technologies, communication protocols, or radio links used in the two or more different paths. The plurality of data packets includes different data packets having different payload or duplicate data packets having a copy of the same payload. The method further includes identifying a first set of data packets received via a first path and a second set of data packets received via a second path based on the packet information.

22 Claims, 12 Drawing Sheets

(56) References Cited

U.S. PATENT DOCUMENTS

| | | | | |
|---|---|---|---|---|
| 2019/0149455 | A1* | 5/2019 | Kucera | H04L 67/141 370/329 |
| 2019/0335379 | A1* | 10/2019 | Joseph | H04L 1/189 |
| 2020/0169916 | A1* | 5/2020 | Gholmieh | H04W 12/106 |
| 2020/0245219 | A1* | 7/2020 | Cheng | H04W 40/12 |
| 2021/0321292 | A1* | 10/2021 | Dudda | H04W 28/0268 |
| 2021/0385169 | A1* | 12/2021 | Urman | H04L 1/08 |
| 2022/0173834 | A1* | 6/2022 | Vidal | H04L 1/0075 |

FOREIGN PATENT DOCUMENTS

| | | |
|---|---|---|
| JP | 2015502712 A | 1/2015 |
| JP | 2015536599 A | 12/2015 |
| WO | 2019184051 A1 | 10/2019 |
| WO | 2020031884 A1 | 2/2020 |

OTHER PUBLICATIONS

Lee et al., "A Multipath Ad Hoc Routing Approach to Combat Wireless Link Insecurity," New Frontiers in Telecommunications, 2003 IEEE International Conference on Communications, ICC 2003, vol. 1, pp. 448-452, XP010642790 (May 11-15, 2003).

"3rd Generation Partnership Project; Technical Specification Group Services and System Aspects; Study on enhancement of 3GPP Support for 5G V2X Services (Release 16)," 3GPP TR 22.886 V16.2.0, total 76 pages, 3rd Generation Partnership Project, Valbonne, France (Dec. 2018).

"3rd Generation Partnership Project; Technical Specification Group Services and System Aspects; System Architecture for the 5G System; Stage 2 (Release 15)," 3GPP TS 23.501 V15.4.0, total 236 pages, 3rd Generation Partnership Project, Valbonne, France (Dec. 2018).

"3rd Generation Partnership Project; Technical Specification Group Core Network and Terminals; General Packet Radio System (GPRS) Tunnelling Protocol User Plane (GTPv1-U)(Release 15)," 3GPP TS 29.281 V15.5.0, total 32 pages, 3rd Generation Partnership Project, Valbonne, France (Dec. 2018).

"3rd Generation Partnership Project; Technical Specification Group Services and System Aspects; Procedures for the 5G System; Stage 2 (Release 15)," 3GPP TS 23.502 V15.4.1, total 347 pages, 3rd Generation Partnership Project, Valbonne, France (Jan. 2019).

"3rd Generation Partnership Project; Technical Specification Group Radio Access Network; NR; Packet Data Convergence Protocol (PDCP) specification (Release 15)," 3GPP TS 38.323 V15.4.0, total 26 pages, 3rd Generation Partnership Project, Valbonne, France (Dec. 2018).

"3rd Generation Partnership Project; Technical Specification Group Radio Access Network; NR; NR and NG-RAN Overall Description; Stage 2 (Release 15)," 3GPP TS 38.300 V15.7.0, total 99 pages, 3rd Generation Partnership Project, Valbonne, France (Sep. 2019).

* cited by examiner

| Octets | Bits | | | | | | | |
|---|---|---|---|---|---|---|---|---|
| | 8 | 7 | 6 | 5 | 4 | 3 | 2 | 1 |
| 1 | Version | | | PT | (*) | E | S | PN |
| 2 | Message Type | | | | | | | |
| 3 | Length (1st octet) | | | | | | | |
| 4 | Length (2nd octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence number (1st Octet)^1)4) | | | | | | | |
| 10 | Sequence number (2nd Octet)^1)4) | | | | | | | |
| 11 | N-PDU Number ^2)4) | | | | | | | |
| 12 | Next Extension Header Type ^3)4) | | | | | | | |

FIG. 10

EXECUTING MULTIPATH COMMUNICATION

CROSS-REFERENCE TO RELATED APPLICATIONS

This application is a continuation of International Application No. PCT/EP2019/080335, filed on Nov. 6, 2019, the disclosure of which is hereby incorporated by reference in its entirety.

FIELD

The present disclosure relates generally to the field of wireless communication technologies; and more specifically, to methods and devices for executing multipath communication.

BACKGROUND

Currently, there are many wireless communication technologies that may be used to communicate between two communication devices. In certain scenarios, communication of data packets between two communication devices may be interrupted or may suffer data loss, experience low-throughput, and/or latency. For example, one communication device may move beyond a communication range of the other communication device in a device-to-device communication causing interruptions in data communication. In another example, a cellular communication may be used to communicate between the two communication devices. Typically, a cellular network provides a larger coverage area as compared to the device-to-device communication. However, sequence numbers of the data packets received via uplink and downlink in cellular communication may be different or the data packets may be disarranged, thereby resulting in data to be erroneous. Thus, the receipt of data packets at a destination device may be unreliable, inefficient, or may be delayed. Generally, the next generation services (e.g. vehicle-to-everything services) have demanding quality-of-service requirements, which may be challenging to meet using conventional methods and systems of wireless communication.

Therefore, in light of the foregoing discussion, there exists a need to overcome the aforementioned drawbacks associated with conventional systems and methods for wireless communication of data packets.

SUMMARY

The present disclosure provides methods, devices, and a computer program product for executing multipath communication. The present disclosure provides a solution to the existing problem of inefficient and unreliable wireless communication of data between at least two communication devices. The present disclosure provides e a solution that overcomes at least partially the problems encountered in the prior art, and provides improved methods and devices that are able to efficiently and reliably communicate data packets.

In a first aspect, the present disclosure provides a method for executing multipath communication at a target communication device. The method comprises obtaining, from a source communication device, a plurality of data packets via two or more different paths, where a header of each data packet of the plurality of data packets comprises packet information. The packet information is indicative of an association among the plurality of data packets. The packet information in each data packet at the source communication device is the same as the packet information in each data packet at the target device irrespective of different radio access technologies, communication protocols, or radio links used in the two or more different paths. The plurality of data packets includes different data packets having different payload or duplicate data packets having a copy of same payload. The method further comprises identifying a first set of data packets from the plurality of data packets received via a first path and a second set of data packets from the plurality of data packets received via a second path based on the packet information.

The method of the first aspect enables to obtain the plurality of data packets via two or more different paths, and further to identify which data packets are received from which path of the two or more different paths. As the packet information in the header of each data packet do not change irrespective of different radio access technologies, communication protocols, or radio links used in the two or more different paths, the method enables to establish correlation among the plurality of data packets traveling in a multipath environment. The method improves the quality-of-service (QoS) of data communication between the source communication device and the target communication device. For example, in a case where the plurality of data packets obtained via two or more different paths includes different data packets having different payload, the method improves data-throughput and reduces latency of data communication between the source communication device and the target communication device. In a case where the plurality of data packets obtained via two or more different paths includes duplicate data packets having a copy of same payload, the method increases reliability of data communication between the source communication device and the target communication device.

In a first implementation form of the first aspect, at least one of the first path or the second path corresponds to a device-to-device communication between the source communication device and the target communication device.

At least one of the first set of data packets or the second set of data packets is received via a direct link between the source communication device and the target communication device in the device-to-device communication, which reduces latency and increases flexibility of data communication.

In a second implementation form of the first aspect, the first path of the two or more different paths is a cellular communication path, and wherein the second path of the two or more different paths is a sidelink communication path that corresponds to the device-to-device communication, and wherein the source communication device and the target communication device is at least one of: a vehicle, an electronic device used in a vehicle, or a portable electronic device.

The cellular communication path provides a large coverage area, whereas the sidelink communication path increases capacity and network performance through spatial frequency reuse. Thus, multipath communication using both the cellular communication and the sidelink communication allows enhanced and reliable communication between two communication devices.

In a third implementation form of the first aspect, the method further comprises filtering, by the target communication device, duplicate data packets from the plurality of data packets received at the target communication device based on the packet information.

The filtering of the duplicate data packets ensures that the data is not replicated when finally presented at the target communication device.

In a fourth implementation form of the first aspect, the method comprises reordering, by the target communication device, the plurality of data packets by a sequence number associated with each of the plurality of data packets based on the packet information, where the plurality of data packets includes different data packets obtained via the first path and the second path in a split mode.

The reordering of plurality of data packets by a sequence number ensures that the data packets are rearranged at the target communication device in a sequence that is same as the sequence in which the data packets are communicated by the source communication device. The method thereby ensures complete data recovery at the target communication device with high reliability and avoids data loss.

In a second aspect, the present disclosure provides a method for executing multipath communication at a source communication device. The method comprises providing, to a target communication device, a first set of data packets from a plurality of data packets via a first path and a second set of data packets from the plurality of data packets via a second path. A header of each data packet includes packet information indicative of an association among the plurality of data packets. The plurality of data packets includes different data packets having different payload or duplicate data packets having a copy of same payload.

The method improves flexibility in data communication as two different paths are used to communicate different data packets having different payload or duplicate data packets having a copy of same payload. In a case where the second set of data packets provided via the second path are duplicate data packets having a copy of same payload of the first set of data packets provided via the first path, the method increases reliability of data communication between the source communication device and the target communication device by executing the multipath communication. Further, in a case where the first set of data packets are different data packets having different payload than the second set of data packets, the method improves data-throughput and reduces latency of data communication between the source communication device and the target communication device by executing the multipath communication.

In a first implementation form of the second aspect, one of the first path or the second path corresponds to a device-to-device communication between the source communication device and the target communication device, and wherein the packet information in each data packet at the source communication device is the same as the packet information in each data packet at the target device irrespective of different radio access technologies, communication protocols, or radio links used in the two or more different paths.

At least one of the first set of data packets or the second set of data packets is provided to the target communication device received via a direct link between the source communication device and the target communication device in the device-to-device communication, which reduces latency and increases flexibility of data communication. Since the packet information in each data packet at the source communication device is the same as the packet information in each data packet at the target device irrespective of different radio access technologies, communication protocols, or radio links used in the first path and the second path, and the method facilitates end-to-end tracking, and correlation of the data packets traveling in the multipath environment.

In a second implementation form of the second aspect, the method comprises selecting, by the source communication device, a duplication mode or a split mode to communicate the plurality of data packets to the target communication device via two or more different paths, where the selection of the duplication mode or the split mode occurs before a start of a data session or during a data session.

The decision to select the duplication mode or the split improves flexibility in data communication. Specifically, the selection of the duplication mode enhances reliability of the data communication, whereas the selection of the split mode enhances throughput as well as reduces latency in the data communication. Moreover, as the selection is possible before a start of a data session or even during a data session, a fail-safe communication is ensured.

In a third implementation form of the second aspect, the method further comprises communicating, by the source communication device, the first set of data packets via the first path to a network entity in an uplink transmission and the second set of data packets via the second path to the target communication device as duplicate data packets based on the selection of the duplication mode, wherein at least a payload of the first set of data packets is same as the payload of the second set of data packets in the duplication mode.

The payload of the first set of data packets is same as the payload of the second set of data packets in the duplication mode, which ensures that all the data packets communicated by the source communication device is reliably received at the target communication device, and the risk of any data loss, for example, due to signal fading, is significantly reduced.

In a fourth implementation form of the second aspect, the method further comprises communicating, by the source communication device, the first set of data packets via the first path to a network entity in an uplink transmission and the second set of data packets via the second path to the target communication device, wherein a payload of the first set of data packets is different from a payload of the second set of data packets in the split mode.

The payload of the first set of data packets is different from the payload of the second set of data packets in the split mode, which ensures that the data is provided to the target communication device by the source communication at a faster rate as compared to the data packets communicated via the duplication mode.

In a fourth implementation form of the second aspect, the header of each data packet of the plurality of data packets or a signalling message transmitted by the source communication device to at least one of a network entity or the target communication device upon establishment or update of the data session includes an indicator. The indicator indicates enablement of a multipath function at network entity or at the target communication device.

The activation enables the network entity (e.g. a radio access network node or a core network entity) to know that it has to perform specific functions, for example, retention of the packet information in the header of each received data packet. The indicator enables an end-to-end tracking and correlation of the data packets traveling in the multipath environment.

In a third aspect, the present disclosure provides a method for executing multipath communication at a network entity. The method comprises obtaining, from a source communication device, a first set of data packets, wherein a header of each data packet of the first set of data packets comprises packet information. The packet information is indicative of an association among the first set of data packets. The method further comprises mapping an uplink sequence number to a downlink sequence number for each data packet of the received first set of data packets based on the packet information, and providing each received data packet of the first set of data packets that includes the packet information to at least one of a target communication device or a further network entity based on the mapped uplink sequence number to the downlink sequence number.

The mapping of the uplink sequence number to a downlink sequence number for each data packet of the first set of data packets addresses the data packets disarrangement issues. As a result of the mapping, there is no need to apply the conventional sequence number derivation method for the downlink data packets. Moreover, based on the packet information and the mapping, the method enables an end-to-end tracking and correlation of the first set of data packets obtained from the source communication device, and further provided to the target communication device or the further network entity (e.g. another radio access network node or a core network entity).

In a first implementation form of the third aspect, the uplink sequence number is received in a specified network layer from the source communication device, and wherein the uplink sequence number is mapped to the downlink sequence number in the specified network layer. The specified network layer is at least one of a Packet Data Convergence Protocol (PDCP) layer, a Service Data Adaptation Protocol (SDAP) layer, or other network layer.

The uplink sequence number in the specified network layer (e.g. uplink PDCP sequence number) is retained and mapped to the downlink sequence number in the specified network layer (e.g. downlink PDCP sequence number), which addresses the data packets disarrangement issues, and ensures correct ordering of such data packets.

In a second implementation form of the third aspect, the method further comprises appending, by the network entity, the uplink sequence number received from the source communication device in a core network protocol-based header of each received data packet of the first set of data packets. The method further comprises communicating, by the network entity, each received data packet of the first set of data packets having the core network protocol-based header that includes the appended uplink SN to the core network entity, wherein the core network protocol-based header that includes the appended uplink sequence number is a modified core network protocol-based header that includes the appended uplink sequence number as an extension in a header structure of the core network protocol-based header In order to address disarrangement issues of data packets and allow the target communication device to be able to compare data packets transmitted via the first path with the second path, the core network protocol-based header of each data packet obtained by the network entity (i.e. source network entity) is appended with the uplink sequence number obtained from the source communication device.

In a third implementation form of the third aspect, the core network protocol-based header is a General Packet Radio Service (GPRS) Tunnelling Protocol User plane (GTP-U) header.

In conventional systems, sequence numbers of the data packets received via uplink and downlink in a cellular communication is potentially different or the data packets potentially becomes disarranged (i.e. incorrectly ordered). Thus, by use of the modified GTP-U header that includes the appended uplink sequence number, the disarrangement issue of data packets is addressed while a data packet travels via a cellular network.

In a fourth implementation form of the third aspect, the method further comprises setting, by the network entity, the retrieved uplink sequence number as a downlink sequence number in each received data packet of the plurality of data packets prior to a downlink transmission of the received data packets of the first set of data packets to the target communication device.

As the downlink sequence number of each data packet is same as that of the respective uplink sequence number, thus, there is no need to apply the usual sequence number derivation method for the downlink data packets, and a reliable end-to-end tracking of the data packets is ensured throughout the communication process.

In a fifth implementation form of the third aspect, the method further comprises enabling, by the network entity, a multipath function based on an indicator in the header of each data packet of the first set of data packets or in a signalling message transmitted by the source communication device. The enablement of the multipath function includes storing the packet information in each data packet of the first set of data packets received at the network entity and reusing the packet information to further provide each received packet to the target communication device; or routing each data packet of the first set of data packets having the packet information to a further network entity that reuses the packet information to further provide each received packet to the target communication device via the network entity, or another network entity.

In order to allow the target communication device to be able to compare and track data packets transmitted via the first path and the second path, the method enables to activate the multipath function by a per data packet basis by use of the indicator in the header of each data packet or by a session level basis by use of the signalling message.

In a fourth aspect, the present disclosure provides a target communication device for executing a multipath communication. The target communication device comprises a control circuitry configured to obtain, from a source communication device, a plurality of data packets via two or more different paths, wherein a header of each data packet of the plurality of data packets comprises packet information. The packet information is indicative of an association among the plurality of data packets. The packet information in each data packet at the source communication device is the same as the packet information in each data packet at the target device irrespective of different radio access technologies, communication protocols, or radio links used in the two or more different paths. The plurality of data packets includes different data packets having different payload or duplicate data packets having a copy of same payload. The control circuitry is further configured to identify a first set of data packets from the plurality of data packets received via a first path and a second set of data packets from the plurality of data packets received via a second path based on the packet information.

In further implementation forms of the target communication device of the fourth aspect the control circuit is configured to perform the features of the implementation forms of the method according to the first aspect. Hence, implementation forms of the target communication device comprise the feature(s) of the corresponding implementation form of the method of the first aspect.

The target communication device of the fourth aspect achieves all the advantages and effects of the method of the first aspect.

In a fifth aspect, the present disclosure provides a source communication device for executing a multipath communication. The source communication device comprises a control circuitry configured to provide, to a target communication device, a first set of data packets from a plurality of data packets via a first path and a second set of data packets from the plurality of data packets via a second path, wherein a header of each data packet includes packet information indicative of an association among the plurality of data packets. The plurality of data packets includes different data packets having different payload or duplicate data packets having a copy of same payload.

In further implementation forms of the source communication device of the fifth aspect the control circuit is configured to perform the features of the implementation forms of the method according to the second aspect. Hence, implementation forms of the source communication device comprise the feature(s) of the corresponding implementation form of the method of the second aspect.

The source communication device of the fifth aspect achieves all the advantages and effects of the method of the second aspect.

In a sixth aspect, the present disclosure provides a network entity for executing a multipath communication. The network entity comprises an entity control circuitry that is configured to obtain, from a source communication device, a first set of data packets, wherein a header of each data packet of the first set of data packets comprises packet information, wherein the packet information is indicative of an association among the first set of data packets. The entity control circuitry is further configured to map an uplink sequence number to a downlink sequence number for each data packet of the received first set of data packets based on the packet information. The entity control circuitry is further configured to provide each received data packet of the first set of data packets that includes the packet information to at least one of a target communication device or a further network entity based on the mapped uplink sequence number to the downlink sequence number.

In further implementation forms of the network entity of the sixth aspect the control circuit is configured to perform the features of the implementation forms of the method according to the third aspect. Hence, implementation forms of the network entity comprise the feature(s) of the corresponding implementation form of the method of the second aspect.

The network entity of the sixth aspect achieves all the advantages and effects of the method of the third aspect.

In a seventh aspect, the present disclosure provides a computer program product that comprises a non-transitory computer-readable storage medium having computer-readable instructions stored thereon, the computer-readable instructions being executable by a computerised device comprising processing hardware to execute the aforementioned method of the first aspect, the second aspect, or the third aspect.

The computer program product of the seventh aspect achieves all the advantages and effects of the method of the first aspect, the second aspect, or the third aspect.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to the exemplary methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 10 is an illustration of an exemplary structure of a General Packet Radio Service (GPRS) Tunnelling Protocol User Plane (GTP-U) header, in accordance with an embodiment of the present disclosure;

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
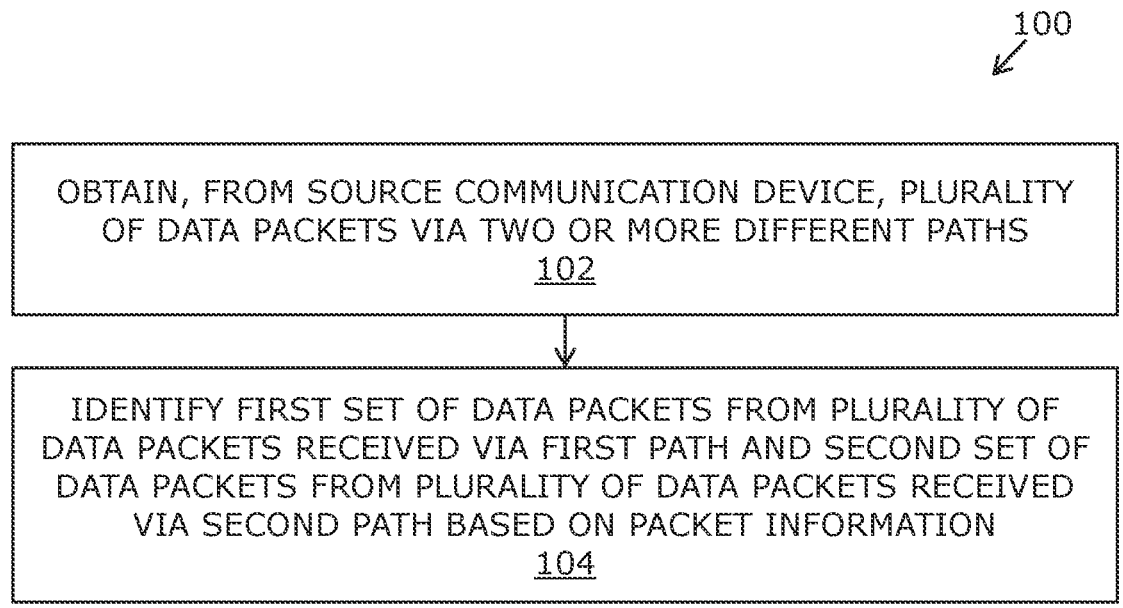
FIG. 1 is a flowchart of a method for executing multipath communication at a target communication device, in accordance with an embodiment of the present disclosure.

FIG. 1 is a flowchart of a method 100 for executing multipath communication at a target communication device, in accordance with an embodiment of the present disclosure. The method 100 is executed by a target communication device described, for example, in FIG. 4A. The method 100 includes steps 102 and 104.

At step 102, a plurality of data packets is obtained via two or more different paths from a source communication device. Each path of the two or more different path is different from other paths in use of at least a radio access technology, a communication protocol, a radio link, an interface, or a combination thereof. In an example, the two or more different paths may refer to a cellular communication path and a sidelink communication path. In another example, the two or more different paths may refer to different device-to-device communications. A header of each data packet of the plurality of data packets comprises packet information. The packet information is indicative of an association among the plurality of data packets. Alternatively stated, the packet information links the plurality of data packets irrespective of different radio access technologies, communication protocols, or radio links used in the two or more different paths. The packet information in each data packet at the source communication device is the same as the packet information in each data packet at the target device irrespective of different radio access technologies, communication protocols, or radio links used in the two or more different paths. The plurality of data packets includes different data packets having different payload or duplicate data packets having a copy of same payload.

At step 104, a first set of data packets from the plurality of data packets received via a first path and a second set of data packets from the plurality of data packets received via a second path are identified based on the packet information. In an example, the packet information may be a packet identifier (e.g. for a split data packet or a duplicate data packet) or a sequence number that is stored (i.e. maintained) in the header of each data packet of the plurality of data packets irrespective of a path traversed by the plurality of data packets from the source communication device to the target communication device. Such packet information is used to identify which data packets are received from which path of the two or more different paths at the target communication device.

In accordance with an embodiment, one of the first path or the second path corresponds to a device-to-device communication between the source communication device and the target communication device. Alternatively, the first path of the two or more different paths is a cellular communication path and the second path of the two or more different paths is a sidelink communication path that corresponds to the device-to-device communication. Notably, the cellular communication path has different transmission characteristics than the sidelink communication path. For instance, the cellular communication path provides a better signal coverage area than the sidelink communication path, whereas the sidelink communication path reduces latency and increases capacity and network performance through spatial frequency reuse. It is known that the next generation services, such as vehicle-to-everything (V2X) services have demanding Quality of service (QoS) requirements as specified in 3rd Generation Partnership Project (3GPP). Thus, the two or more different paths may be utilized concurrently for data communication in order to achieve the target QoS requirements. Other examples of the first path and the second path are described, for example, in FIG. 4A.

In accordance with an embodiment, the method 100 further comprises filtering, by the target communication device, duplicate data packets from the plurality of data packets received at the target communication device based on the packet information. In a case where the plurality of data packets obtained by the target communication device includes duplicate data packets, the redundant data packets in the first set of data packets or the second set of data packets are removed before final presentation (i.e. output for user consumption) at the target communication device. In an example, the filtering of duplicate data packets is executed at a specific network layer (also referred to as a protocol layer), such as an application layer, a convergence layer (a V2X layer in case of a vehicle), or a packet data convergence protocol (PDCP) layer, of a radio protocol stack in the target communication device.

In accordance with an embodiment, the method 100 further comprises reordering, by the target communication device, the plurality of data packets by a sequence number associated with each of the plurality of data packets based on the packet information, where the plurality of data packets includes different data packets obtained via the first path and the second path in a split mode. In a case where the plurality of data packets obtained by the target communication device includes different data packets, the packet information that includes a dedicated sequence number is checked in each data packet and accordingly the plurality of data packets are aligned in a sequential order before final presentation (i.e. output for user consumption) at the target communication device. The first set of data packets received via the first path and the second set of data packets received concurrently via the second path improves data-throughput and reduces latency of data communication.

The steps 102 and 104 are only illustrative and other alternatives can also be provided where one or more steps are added, one or more steps are removed, or one or more steps are provided in a different sequence without departing from the scope of the claims herein.

Figure 2:
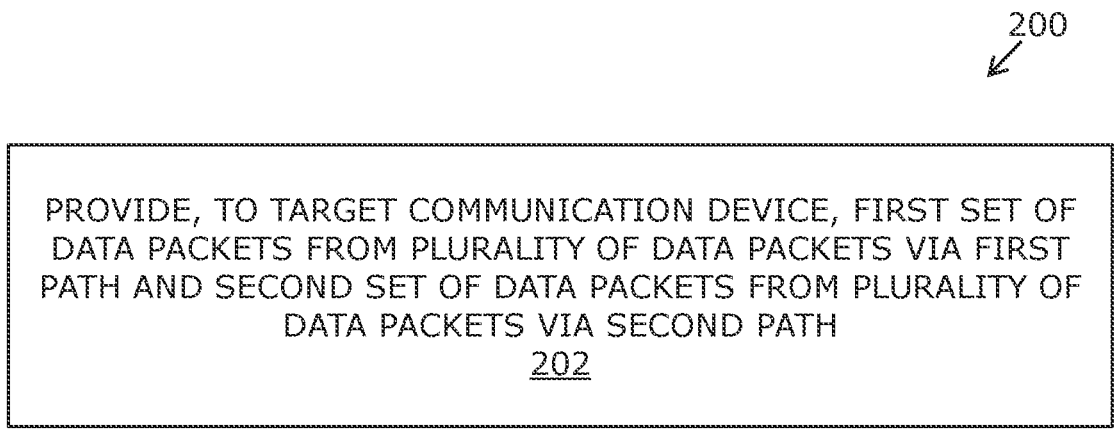
FIG. 2 is a flowchart of a method for executing multipath communication at a source communication device, in accordance with an embodiment of the present disclosure.

FIG. 2 is a flowchart of a method 200 for executing multipath communication at a source communication device, in accordance with an embodiment of the present disclosure. The method 200 is executed by a source communication device described, for example, in FIG. 4A.

At step 202, a first set of data packets from a plurality of data packets via a first path and a second set of data packets from the plurality of data packets via a second path are provided to a target communication device. Alternatively stated, a multipath communication is executed at the source communication device to provide the plurality of data packets to the target communication device. The multipath communication refers to communication of data via two or more different paths to a common destination device (such as the target communication device in this case), where each path is different from other paths in use of at least a radio access technology, a communication protocol, a radio link, an interface, or a combination thereof, to communicate data. For example, a data item, such as text, audio, video, or other media, or their combination, may be communicated from the source communication device to the target communication device. Such data item is segmented into the plurality of data packets. A header of each data packet of the plurality of data packets includes packet information indicative of an association among the plurality of data packets. For example, the packet information indicates that the plurality of data packets belongs a same data item and further indicates whether a data packet is a duplicate data packet or a split data packet. Alternatively stated, the packet information links the plurality of data packets irrespective of different radio access technologies, communication protocols, or radio links traversed by the first set of data packet and the second set of data packets from the source communication device to the target communication device. The plurality of data packets includes different data packets having different payload (i.e. the split data packets) or duplicate data packets having a copy of same payload. The duplicate data packets and the split data packets are further described, for example, in FIGS. 4B and 4C respectively.

In accordance with an embodiment, at least one of the first path or the second path corresponds to a device-to-device communication between the source communication device and the target communication device. For example, the first path may be a cellular communication path and the second path may be a sidelink communication path that corresponds to the device-to-device communication. In a case where the first path is the cellular communication path, the first set of data packets from the plurality of data packets is communicated via a cellular interface (e.g. a Uu interface). In a case where the second path is the sidelink communication path, the second set of data packets of the plurality of data packets are communicated via a sidelink interface (e.g. a PC5 or PC3 interface) or other interfaces configured for device-to-device communication. The source communication device may support both the cellular interface and the sidelink interface. Alternatively, the first path and the second path may refer to different device-to-device communication (e.g. IEEE 802.11p (also known as dedicated short-range communication (DSRC) or intelligent transport system (ITS)-G5 dedicated to road transport and traffic telematics), Wireless Fidelity (Wi-Fi), Wi-Fi Direct, Long Term evolution (LTE) Direct, 5G New Radio (NR) based device-to-device communication, and the like).

In accordance with an embodiment, the method 200 further includes selecting, by the source communication device, a duplication mode or a split mode to communicate the plurality of data packets to the target communication device via two or more different paths. The selection of the duplication mode or the split mode occurs before a start of a data session or during a data session. Optionally, one of the duplication mode or the split mode is set as default at the source communication device. Optionally, the selection of the duplication mode or the split mode is made based on a user input provided to the source communication device. Alternatively, the selection is made automatically based on a type or a size of data (or data item) to be communicated. In the duplication mode, duplicate data packets having a copy of same payload are communicated via at least two different paths to ensure that all data packets reliably reach a common destination, such as the target communication device. The duplication mode enables redundancy of radio links that increases reliability of data communication. In the split mode, the plurality of data packets are split into the first set of data packets and the second set of data packets, where each data packet have different payload. Thereafter, the first set of data packets and the second set of data packets are provided from the source communication device to a common destination, such as the target communication device, via at least two different paths to increase throughput and reduce latency.

In accordance with an embodiment, the method 200 further includes communicating, by the source communication device, the first set of data packets via the first path to a network entity in an uplink transmission and the second set of data packets via the second path to the target communication device as duplicate data packets based on the selection of the duplication mode. In this case, at least a payload of the first set of data packets is same as the payload of the second set of data packets in the duplication mode. Alternatively, the method 200 further includes comprising communicating, by the source communication device, the first set of data packets via the first path to the network entity in an uplink transmission and the second set of data packets via the second path to the target communication device. In this case, a payload of the first set of data packets is different from a payload of the second set of data packets in the split mode. In a case where the first path is the cellular communication path, the first set of data packets is communicated to the network entity, such as a base station, in the uplink transmission. Optionally, the first set of data packets traverses through various network entities, such as a source radio access network node (e.g. the base station), a core network entity, or a target radio access network node, where different types communication protocols are used. This means that different headers and identifiers may be used from one node to another network node. In contrast to conventional methods and systems, the packet information in the header of each data packet of the plurality of data packet is an additional control information that remains unaltered in the header of each data irrespective of different radio access technologies, communication protocols, or radio links used in the first path and the second path, and the different network nodes traversed by the first set of data packets.

In accordance with an embodiment, the header of each data packet of the plurality of data packets or a signalling message transmitted by the source communication device to at least one of a network entity or the target communication device upon establishment or update of the data session includes an indicator. The indicator indicates enablement of a multipath function at network entity or at the target communication device. The signalling message may refer to control plane signalling or other signalling message. In an example, the indicator may be a specific bit value (e.g. bit value "1") from the binary bit value ("0" or "1") which may be set in a data packet in at least one reserve field of a specific network layer (e.g. PDCP layer header) at the source communication device. The specific bit value acts as a flag to signal the network entity or the target communication device that the multipath function is to be enabled. An example of the indicator is further described in FIG. 12. The enablement of the multipath function refers to an indication that a specific treatment needs to be provided to the data packets that has the indicator. The specific treatment refers to a configuration change or a network capability which allows storage (or maintenance) of the packet information in the header of each data packet of the plurality of data packets received at the network entity (e.g. a base station) and reusage of the packet information to further provide each received packet to the target communication device.

The steps 202 is only illustrative and other alternatives can also be provided where one or more steps are added, one or more steps are removed, or one or more steps are provided in a different sequence without departing from the scope of the claims herein.

Figure 3:
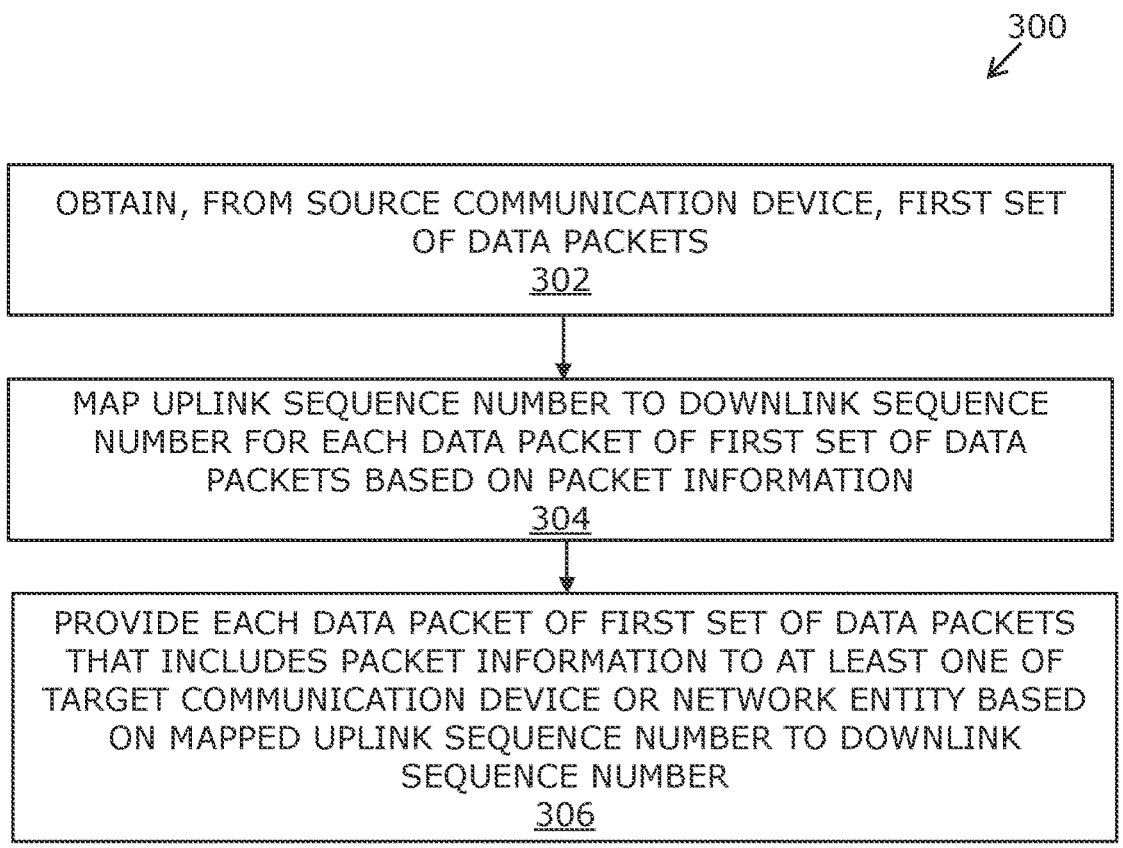
FIG. 3 is a flowchart of a method for executing multipath communication at a network entity, in accordance with an embodiment of the present disclosure.

FIG. 3 is a flowchart of a method 300 for executing multipath communication at a network entity, in accordance with an embodiment of the present disclosure. The method 300 is executed by a network entity described, for example, in FIG. 6. The method 300 includes steps 302 to 306.

At step 302, a first set of data packets is obtained from a source communication device. For example, the first set of data packets are obtained via the cellular communication path. A header of each data packet of the first set of data packets comprises packet information. The packet information is indicative of an association among the first set of data packets.

At step 304, an uplink sequence number is mapped to a downlink sequence number for each data packet of the received first set of data packets based on the packet information. In accordance with an embodiment, the uplink sequence number is received in a specified network layer from the source communication device. The uplink sequence number is mapped to the downlink sequence number in the specified network layer. The specified network layer is at least one of a PDCP layer, a Service Data Adaptation Protocol (SDAP) layer, or another network layer. In an example, the network entity (such as the source network access node) may be configured to perform mapping of uplink PDCP sequence number with downlink PDCP sequence number in order to address incorrect ordering of data packets and enable the target communication device to compare (or match) data packets received via sidelink communication path with the data packets received via the cellular communication path. Thus, in this case there no need for the network entity (or the target network entity) to apply the conventional PDCP sequence derivation method for the downlink data packets.

At step 306, each received data packet of the first set of data packets that includes the packet information is provided to at least one of a target communication device or a further network entity based on the mapped uplink sequence number to the downlink sequence number.

Optionally, the method 300 further includes appending, by the network entity, the uplink sequence number (SN) received from the source communication device in a core network protocol-based header of each received data packet of the first set of data packets. The method further includes communicating, by the network entity, each received data packet of the first set of data packets having the core network protocol-based header that includes the appended uplink SN to a core network entity. The core network protocol-based header that includes the appended uplink SN is a modified core network protocol-based header that includes the appended uplink SN as an extension in a header structure of the core network protocol-based header. Optionally, the core network protocol-based header is a General Packet Radio Service (GPRS) Tunnelling Protocol User Plane (GTP-U) header. An example of the GTP-U header is described, for example, in FIG. 10. Alternatively, the first set of data packets may not be forwarded to the core network entity, and may directly be communicated from the network entity to the target communication device in the downlink transmission. Optionally, the first set of data packets may not be forwarded to the core network entity, and but may be forwarded to a further network entity, such as the target radio access node, which then forwards the first set of data packets to the target communication device in the downlink transmission. In such cases, the core network protocol-based header may not be used.

In accordance with an embodiment, the method 300 further includes setting, by the network entity, the retrieved uplink SN as a downlink SN in each received data packet of the plurality of data packets prior to a downlink transmission of the received data packets of the first set of data packets to the target communication device.

In accordance with an embodiment, the method 300 further includes enabling, by the network entity, a multipath function based on an indicator in the header of each data packet of the first set of data packets or in a signalling message transmitted by the source communication device. An example of the indicator in the header of a data packet is described, for example, in FIG. 12. An example of the signalling message(s) in a session is described, for example, in FIG. 11. The enablement of the multipath function includes storage (or maintenance) of the packet information in each data packet of the first set of data packets received at the network entity and reusing the packet information to further provide each received packet to the target communication device. Alternatively, the enablement of the multipath function includes routing each data packet of the first set of data packets having the packet information to a further network entity that reuses the packet information to further provide each received packet to the target communication device via the network entity, or another network entity.

The steps 302, 304, and 306 are only illustrative and other alternatives can also be provided where one or more steps are added, one or more steps are removed, or one or more steps are provided in a different sequence without departing from the scope of the claims herein.

Figure 4A:
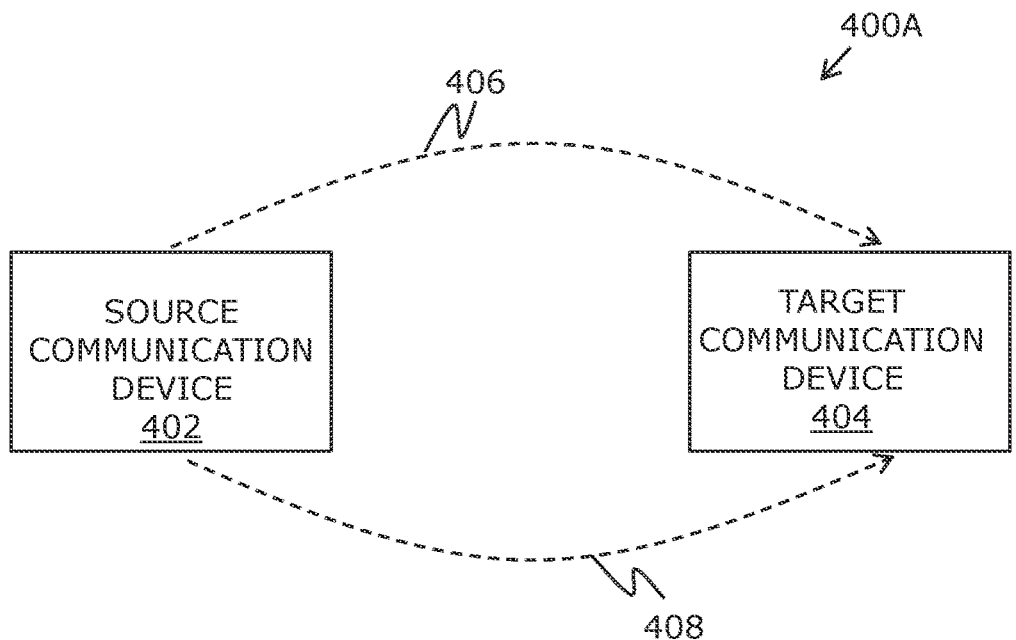
FIG. 4A is a network environment diagram of a system with a source communication device and a target communication device, in accordance with an embodiment of the present disclosure.

FIG. 4A is a block diagram that illustrates a network environment of a system 400A for executing multipath communication, in accordance with an embodiment of the present disclosure. With reference to FIG. 4A, there is shown a network environment of the system 400A that includes a source communication device 402 and a target communication device 404. There is further shown a first path 406 and a second path 408. The source communication device 402 and the target communication device 404 may be configured to establish communication with each other via two or more different paths, such as the first path 406 and the second path 408.

Each of the source communication device 402 and the target communication device 404 may include suitable logic, circuitry, interfaces and/or code that is configured to communicate (send/receive) data via the two or more different paths. In accordance with an embodiment, each of the source communication device 402 and the target communication device 404 is at least one of: a vehicle, an electronic device (e.g. an electronic control unit (ECU), an in-vehicle infotainment (IVI) system, or other in-vehicle device) used in a vehicle, or a portable electronic device (e.g. a smart phone, a drone, an Internet-of-Things (IoT) device, a machine type communication (MTC) device, a hand-held computing device, an evolved universal mobile telecommunications system (UMTS) terrestrial radio access (E-UTRAN) NR-dual connectivity (EN-DC) device, or any other customized hardware for wireless telecommunication). The vehicle may be a non-autonomous, a semi-autonomous, or an autonomous vehicle.

The multipath communication refers to communication of data via two or more different paths to a common destination device, where each path is different from other paths in use of at least a radio access technology, a communication protocol, a radio link, an interface, or a combination thereof, to communicate data. Thus, the first path 406 is different from the second path 408 in use of the radio access technology, one or more communication protocols, the radio link, and/or the interface to communicate data.

In an example, the first path 406 may be a cellular communication path (i.e. a cellular network-based communication), whereas the second path 408 may be a sidelink communication path (i.e. a device-to-device communication). Examples of the cellular network-based communication includes, but is not limited to $5^{th}$ generation (5G) or 5G NR (e.g. sub 6 GHz, cmWave, or mmWave communication), Long term evolution (LTE) 4G, 3G, or 2G. In cases where the source communication device 402 or the target communication device 404, is a vehicle or an electronic device used in a vehicle, such cellular network-based communication may be a vehicle-to-network (V2N) communication, which operates, for example, by use of a Uu interface in mobile broadband spectrum. The Uu interface refers to a radio interface between a communication device and a radio access network. In this example, the first path 406 uses a cellular network having different radio access technology, communication protocols, radio link, and interface (e.g. the Uu interface) to communicate data, whereas the second path 408 uses a device-to-device communication independent of a cellular network. The device-to-device communication improves spectrum utilisation and capacity and enhance network performance and throughput. Examples of the device-to-device communication include, but is not limited to IEEE 802.11p, Wireless Fidelity (Wi-Fi), Wi-Fi Direct, LTE Direct, an inband device-to-device communication, an outband device-to-device communication, or a proximity-based services (ProSe) based device-to-device communication. The device-to-device communication may be performed in cellular system, which is known as inband device-to-device communication or may occur in unlicensed spectrum, which is known as outband device-to-device communication. The device-to-device communication is a direct communication between the source communication device 402 and the target communication device 404, which is potentially implemented via different interfaces (e.g. a PC5 interface, a PC3 interface, or other wireless local area network (WLAN)-based interface).

In another example, the first path 406 may employ IEEE 802.11p, whereas the second path 408 may employ a 5G-V2X communication or an LTE-V2X (via PC5) communication. In yet another example, the first path 406 and the second path 408 may employ different device-to-device communication, such as the first path 406 may employ LTE PC5, whereas the second path 408 may employ NR PC5. In yet another example, the first path 406 may employ a Wi-Fi based communication, whereas the second path 408 may employ a PC5 interface-based device-to-device communication.

In operation, a user of the source communication device 402 may want to communicate data with the target communication device 404. In accordance with an embodiment, the source communication device 402 is configured to select a duplication mode or a split mode to communicate a plurality of data packets to the target communication device 404 via two or more different paths. The selection of the duplication mode or the split mode occurs before a start of a data session or during a data session. The duplication mode and the split mode is described in details, for example, in FIG. 4B and FIG. 4C respectively.

The source communication device 402 is further configured to provide, to the target communication device 404, a first set of data packets from the plurality of data packets via the first path 406 and a second set of data packets from the plurality of data packets via the second path 408. The plurality of data packets includes different data packets having different payload (e.g. in a case where the split mode is selected) or duplicate data packets having a copy of same payload (e.g. in a case where the duplicate mode is selected). A header of each data packet includes packet information indicative of an association among the plurality of data packets.

Optionally, the source communication device 402 is configured to provide the second set of data packets to the target communication device 404 via the second path 408 in a multi-hop process. For example, even if the target communication device 404 moves beyond a specified device-to-device communication range from the source communication device 402, the first set of data packets may traverse through multiple communication devices in device-to-device communication to finally arrive at the destination device, such as the target communication device 404. For example, the source communication device 102 is "A" and the target communication device is "D". "B" and "C" are intermediate communication devices. "B" may be in device-to-device communication range from "A" and "C" but not "D". "C" may be in device-to-device communication range from "B" and "D" but not "C". Thus, in such cases, "A" can provide the second set of data packets to "D" in the following manner: A to B to C to D, whereas the "D" due to the large coverage area of the cellular communication, may obtain the first set of data packets via the cellular communication path in a downlink transmission.

The target communication device 404 is configured to obtain, from the source communication device 402, the plurality of data packets via the two or more different paths. Notably, the header of each data packet of the plurality of data packets includes packet information. The packet information is indicative of an association among the plurality of data packets. The packet information in each data packet at the source communication device 402 is the same as the packet information in each data packet at the target communication device 404 irrespective of different radio access technologies, communication protocols, or radio links used in the two or more different paths. The plurality of data packets includes different data packets having different payload or duplicate data packets having a copy of same payload. The target communication device 404 is further configured to identify the first set of data packets from the plurality of data packets received via the first path 406 and the second set of data packets from the plurality of data packets received via the second path 408 based on the packet information.

Figure 4B:
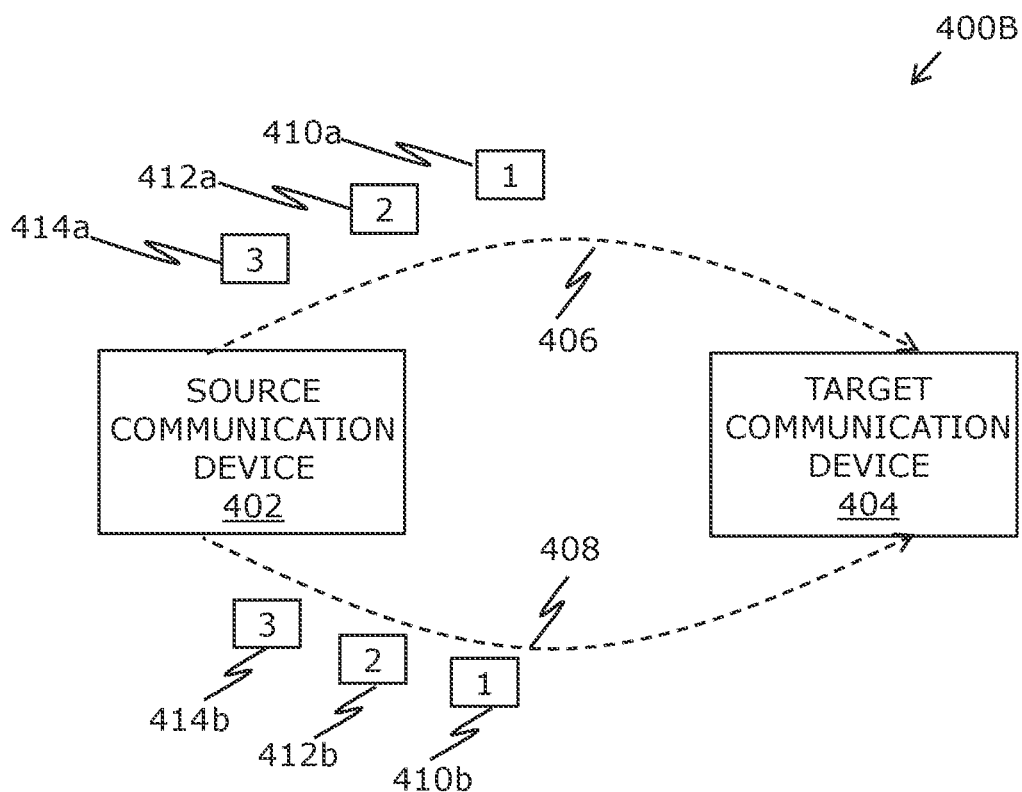
FIG. 4B is a diagram that illustrates data communication via a duplication mode, in accordance with an embodiment of the present disclosure.

FIG. 4B is a block diagram that illustrates data communication via a duplication mode, in accordance with an embodiment of the present disclosure. FIG. 4B is described in conjunction with elements from FIG. 4A. With reference to FIG. 4B, there is shown an exemplary scenario 400B to depict data communication in a duplication mode. There is further shown the source communication device 402, the target communication device 404, the first path 406, the second path 408, a first set of data packets 410a, 412a, and 414a, and a second set of data packets 410b, 412b, and 414b.

There are two modes (or options) for the multipath communication. The two modes are referred to as a duplication mode and a split mode. The duplication mode enables redundancy of radio links that increases reliability of data communication. In the duplication mode, duplicate data packets having a copy of same payload are communicated via at least two different paths to ensure that all data packets reach a common destination, such as the target communication device 404. In the split mode, different data packets having different payload are provided concurrently to the common destination, such as the target communication device 404, via at least two different paths to increase throughput and reduce latency. In other words, some data packets out of a plurality of data packets are communicated via one path whereas some other data packets are concurrently communicated via another path to increase throughput and reduce latency.

In accordance with an embodiment, the source communication device 402 is configured to select the duplication mode to communicate the plurality of data packets to the target communication device 404 via the two or more different paths. The selection of the duplication mode occurs before a start of a data session, i.e. before initiation of transmission of data packets or during the data session. Based on the selection of the duplication mode, the source communication device 402 is configured to provide the first set of data packets 410a, 412a, and 414a via the first path 406. The source communication device 402 is further configured to provide, to the target communication device 404, the second set of data packets 410b, 412b, and 414b via the second path 408 as duplicate data packets based on the selection of the duplication mode. In such a case, at least a payload of the first set of data packets 410a, 412a, and 414a is same as the payload of the second set of data packets 410b, 412b, and 414b in the duplication mode. The data packets of the first set of data packets 410a, 412a, and 414a and duplicate data packets of first set of data packets 410a, 412a, and 414a (i.e. the second set of data packets 410b, 412b, and 414b) are transmitted in sequence (also represented by consecutive numbers 1, 2, and 3 in the FIG. 4B).

In an exemplary implementation, the target communication device 404 is configured to filter the duplicate data packets from the plurality of data packets received at the target communication device 404 based on the packet information. Thus, for data to be error-free, the redundant data packets in the first set of data packets 410a, 412a, and 414a and the second set of data packets 410b, 412b, and 414b that are potentially obtained by the target communication device 404 are filtered out. Such multipath communication via the duplication mode is advantageous to achieve better reliability than communication via a single path.

Figure 4C:
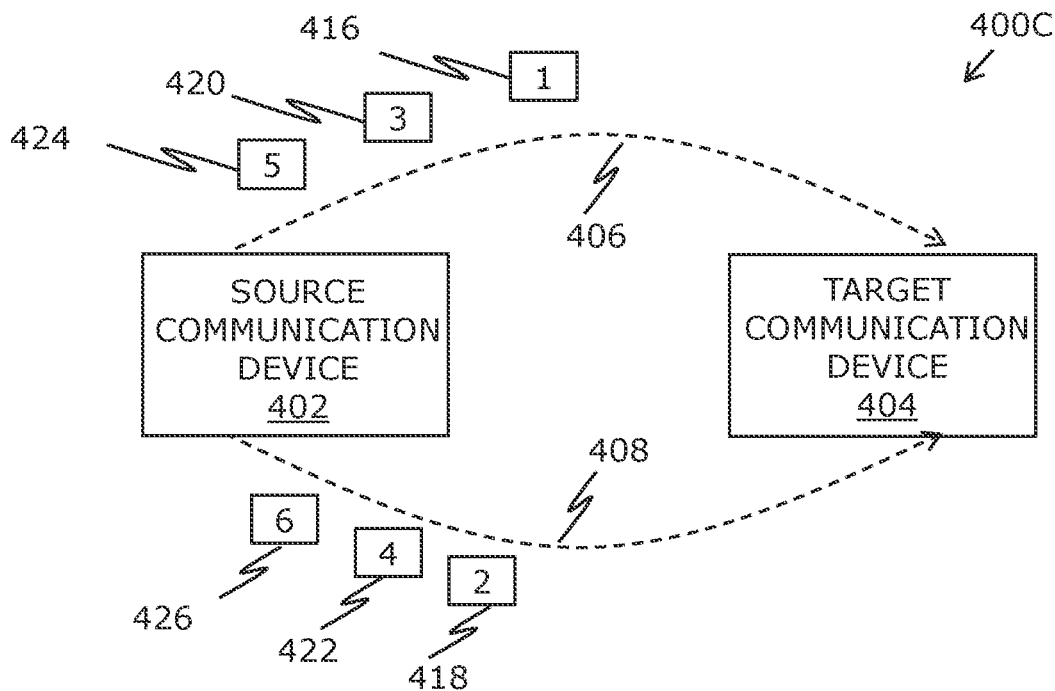
FIG. 4C is a diagram that illustrates data communication via a split mode, in accordance with an embodiment of the present disclosure.

FIG. 4C is a block diagram that illustrates data communication via a split mode, in accordance with an embodiment of the present disclosure. FIG. 4C is described in conjunction with elements from FIG. 4A and FIG. 4B. With reference to FIG. 4C, there is shown an exemplary scenario 400C to depict data communication in a split mode. In the split mode, the plurality of data packets is split into a first set of data packets 416, 420, and 424 that are communicated via the first path 406 and a second set of data packets 418, 422, and 426 that are communicated via the second path 408. The payload of the first set of data packets 416, 420, and 424 is different from a payload of the second set of data packets 418, 422, and 426 in the split mode. In an example, as shown in FIG. 4C, if total six data packets 416, 418, 420, 422, 424, and 426, are to be provided to the target communication device 404, the plurality of data packets are split and communicated concurrently via two paths (i.e. the first path 406 and the second path 408) to increase throughput and reduce latency. The sequence of transmission of data packets is also represented by consecutive numbers 1, 2, 3, 4, 5, and 6. The selection of the duplication mode or the split mode may be made by the source communication device 402 to improve the QoS of the communication between the source communication device 402 and the target communication device 404.

Figure 4D:
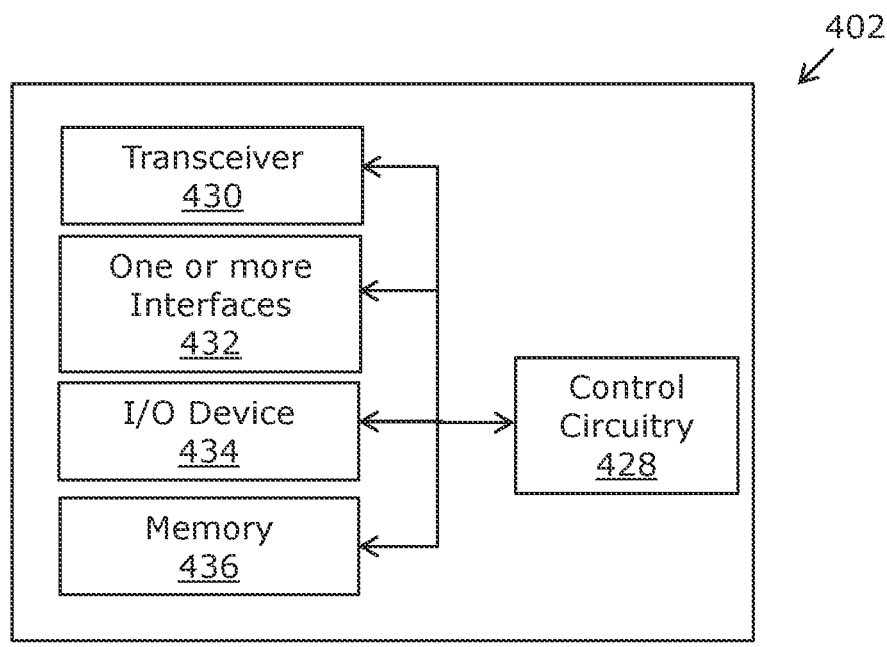
FIG. 4D is a block diagram that illustrates various exemplary components of a source communication device, in accordance with an embodiment of the present disclosure.

FIG. 4D is a block diagram that illustrates various exemplary components of a source communication device, in accordance with an embodiment of the present disclosure. FIG. 4D is described in conjunction with elements from FIGS. 4A, 4B, and 4C. With reference to FIG. 4D, there is shown the source communication device 402. The source communication device 402 includes a control circuitry 428, a transceiver 430, one or more interfaces 432, an input/output (I/O) device 434, and a memory 436. The control circuitry 428 may be communicatively coupled to the transceiver 430, the one or more interfaces 432, the I/O device 434, and the memory 436. In case the source communication device 402 is a vehicle, the control circuitry 428 is communicatively coupled to various components of the source communication device 402 via an in-vehicle network, such as in-vehicle data buses, such as a vehicle area network (VAN) and/or a controller area network (CAN) bus.

As already indicated above, the control circuit in this and in the following embodiments may be a general-purpose processor running a dedicated software or a dedicated hardware circuitry.

The control circuitry 428 is configured to provide a plurality of data packets to the target communication device 404 via two or more different paths. In an implementation, the control circuitry 428 is configured to execute instructions stored in the memory 436. Examples of the control circuitry 428 may include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or circuits. Moreover, the control circuitry 428 may refer to one or more individual processors, processing devices, a processing unit that is part of a machine.

The transceiver 430 may include suitable logic, circuitry, and/or interfaces that may be configured to communicate with one or more external devices, such as a radio access network node (e.g. a base station) or a target communication device 404 via two or more different paths. Examples of the transceiver 430 may include, but is not limited to, an antenna, a telematics unit, a radio frequency (RF) transceiver, one or more amplifiers, one or more oscillators, a digital signal processor, a coder-decoder (CODEC) chipset, and/or a subscriber identity module (SIM) card. The transceiver 430 may wirelessly communicate by use of various communication protocols of the first path 406 and the second path 408 (as described in FIG. 4A).

The one or more interfaces 432 refers to a sidelink interface and a cellular interface. Examples of the sidelink interface include, but is not limited to a PC5 interface, a PC3 interface, or another interface that allows device-to-device communication. Examples of the cellular interface include, but is not limited to Uu interface. In an exemplary implementation, a unified interface may be provided that allows communication to two or more paths via a same unified interface.

The I/O device 434 refers to input and output devices that can receive input from a user and provide output to the user. The I/O device 434 may be communicatively coupled to the control circuitry 428. Examples of input devices may include, but are not limited to, a touch screen, such as a touch screen of a display device, a microphone, a motion sensor, a light sensor, a dedicated hardware input unit (such as a push button), and a docking station. Examples of output devices include a display device and a speaker. Examples of the display device include, but is not limited to a vehicle display (such as a head-up display (HUD), an augmented reality system (AR-HUD), a display screen of a driver information console (DIC), an infotainment unit or head unit (HU)), a non-vehicle display, such as a smart-glass display, a display screen of a portable device, or other display screen.

The memory 436 may include suitable logic, circuitry, and/or interfaces that may be configured to store machine code and/or instructions with at least one code section executable by the control circuitry 428. The memory 436 may store the plurality of data packets for processing and presentation to an application layer of the source communication device 402. Examples of implementation of the memory 436 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory. The memory 436 may store an operating system and/or other program products to operate the source communication device 402. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

Figure 4E:
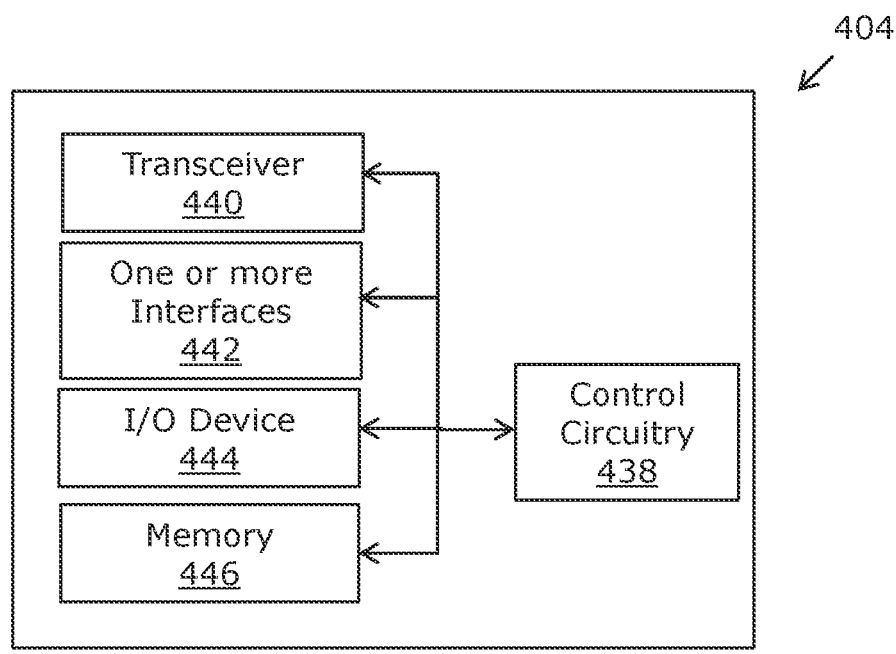
FIG. 4E is a block diagram that illustrates various exemplary components of a target communication device, in accordance with an embodiment of the present disclosure.

FIG. 4E is a block diagram that illustrates various exemplary components of a target communication device, in accordance with an embodiment of the present disclosure. FIG. 4E is described in conjunction with elements from FIGS. 1 to 3, and 4A to 4D. With reference to FIG. 4E, there is shown the target communication device 404. The target communication device 404 includes a control circuitry 438, a transceiver 440, one or more interfaces 442, an input/output (I/O) device 444, and a memory 446. The control circuitry 438 may be communicatively coupled to the transceiver 440, the one or more interfaces 442, the I/O device 444, and the memory 446. In case the target communication device 404 is a vehicle, the control circuitry 438 is communicatively coupled to various components of the target communication device 404 via an in-vehicle network, such as in-vehicle data buses, such as a vehicle area network (VAN) and/or a controller area network (CAN) bus.

The control circuitry 438 is configured to obtain a plurality of data packets via two or more different paths. In an implementation, the control circuitry 428 is configured to execute instructions stored in the memory 436. Examples of the control circuitry 438 is similar to that of the control circuitry 428 (FIG. 4D). Similarly, examples of implementation of the transceiver 440, the one or more interfaces 442, the I/O device 444, and the memory 446 is similar to that of the transceiver 430, the one or more interfaces 432, the I/O device 434, and the memory 436, respectively of FIG. 4D.

Figure 5:
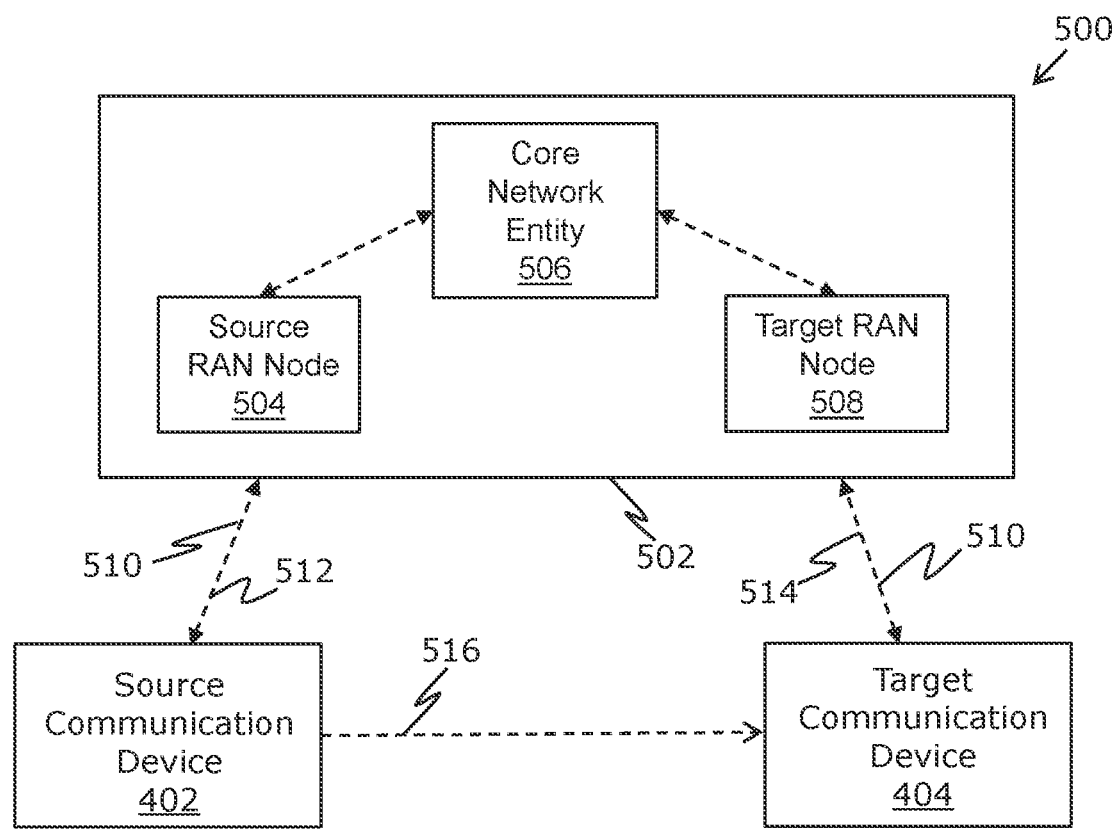
FIG. 5 is a network environment diagram of a system with various nodes of a cellular network, in accordance with an embodiment of the present disclosure.

FIG. 5 is a block diagram that illustrates a network environment of a system 500 with various nodes of a cellular network, in accordance with an embodiment of the present disclosure. FIG. 5 is described in conjunction with elements from FIGS. 1 to 3, and 4A to 4E. With reference to FIG. 5, there is shown the system 500 that includes the source communication device 402, the target communication device 404, and one or more network entities of a cellular network 502, such as a source radio access network (RAN) node 504, a core network entity 506, a target RAN node 508.

Each of the source RAN node 504 and the target RAN node 508 refers to a radio base station, such as a NodeB, an evolved Node B (eNB), Next Generation Node B (gNB), a base transceiver station, an access point base station, a base station router, or any other network entity capable of communicating with a wireless device (e.g. the source communication device 402 or the target communication device 404). The cellular network 502 covers a geographical area which is divided into cell areas, where one or more cell areas are served by the source RAN node 504 and the target RAN node 508.

The core network entity 506 is a part of the cellular network 502 that connects the different nodes (or parts) of the access network (i.e. RAN). In LTE, the core network entity 506 includes, for example, serving gateway (S-GW), packet data network (PDN) gateway (PDN GW), mobility management entity, Home Subscriber Server (HSS) as evolved packet core (EPC). In case of 5G, network entities are referred to as "functions" and are usually not referred to as "nodes". For example, the functions of the 4G S-GW and PDN-GW is merged into a single entity, called user plane function (UPF). In another example, the 4G MME is split into two individual functions, such as access management function (AMF) and session management function (SMF). However, in the present disclosure, a network entity may cover both access node entities and core network entities (e.g. network nodes or functions).

In operation, the source communication device 402 is configured to provide a first set of data packets from a plurality of data packets to the target communication device 404 via a cellular communication path 510. In order to provide the first set of data packets to the target communication device 404 via the cellular communication path 510, the first set of data packets are first communicated to a network entity (such as the source RAN node 504) in an uplink transmission 512. Thereafter, the first set of data packets may be further communicated to the target communication device 404 or a further network entity, such as the core network entity 506 and the target RAN node 508, to provide to the target communication device 404 in a downlink transmission 514. The source communication device 402 is further configured to communicate a second set of data packets from the plurality of data packets to the target communication device 404 via a sidelink communication path 516. A header of each data packet includes packet information that is indicative of an association among the plurality of data packets.

The network entity, such as the source RAN node 504, is configured to obtain, from the source communication device 402, the first set of data packets. The header of each data packet of the first set of data packets comprises packet information.

In accordance with an embodiment, the network (such as the source RAN node 504) is configured to enable a multipath function based on an indicator in the header of each data packet of the first set of data packets or in a signalling message transmitted by the source communication device 402. The multipath function refers to a network capability which allows storage (or maintenance) of the packet information in the header of each data packet of the first set of data packets received at the network entity (such as the source RAN node 504) and reusage of the packet information to further provide each received packet to the target communication device 404. In a case where the data packet from the network entity (such as the source RAN node 504) traverses through the core network entity 506 or one or more other RAN nodes, such as the target RAN node 508, the multipath function refers to a network capability which allows routing of each data packet of the first set of data packets having the packet information to a further network entity that reuses the packet information to further provide each received packet to the target communication device 404 via the network entity (such as the source RAN node 504), or another network entity (such as the target RAN node 508).

The network entity, such as the source RAN node 504, is further configured to map an uplink sequence number (e.g. uplink PDCP sequence number) to a downlink sequence number (e.g. downlink PDCP sequence number) for each data packet of the received first set of data packets based on the packet information. The network entity, such as the source RAN node 504, is further configured to provide each received data packet of the first set of data packets that includes the packet information to at least one of the target communication device 404 or a further network entity (such as the core network entity 506 or the target RAN node 508) based on the mapped uplink sequence number to the downlink sequence number.

The target communication device 404 is configured to obtain the plurality of data packets via the cellular communication path 510 and the sidelink communication path 516. The plurality of data packets includes different data packets having different payload or duplicate data packets having a copy of same payload. The target communication device 404 is configured to identify the first set of data packets from the plurality of data packets received via the cellular communication path 510 and the second set of data packets from the plurality of data packets received via the sidelink communication path 516 based on the packet information.

Figure 6:
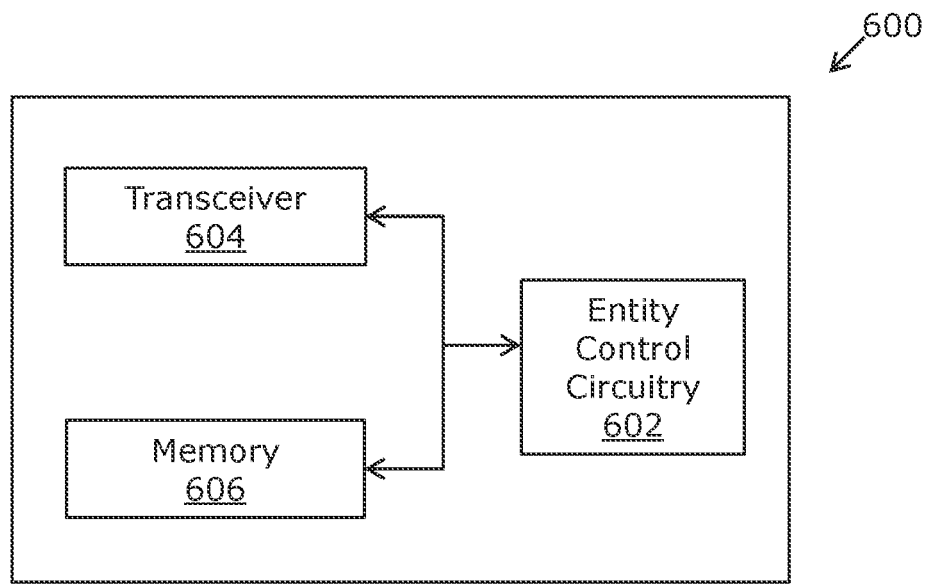
FIG. 6 is a block diagram that illustrates various exemplary components of a network entity, in accordance with an embodiment of the present disclosure.

FIG. 6 is a block diagram that illustrates various exemplary components of a network entity, in accordance with an embodiment of the present disclosure. FIG. 6 is described in conjunction with elements from FIGS. 4A to 4E, and 5. With reference to FIG. 6, there is shown a network entity 600. The network entity 600 corresponds to one of the network entities of the cellular network 502 (FIG. 5). The network entity 600 covers both access network entities (e.g. RAN node) and core network entities (e.g. nodes or functions). The network entity 600 includes an entity control circuitry 602, a transceiver 604, and a memory 606. The entity control circuitry 602 is communicatively coupled to the transceiver 604, and the memory 606.

The entity control circuitry 602 is configured to obtain a first set of data packets from the source communication device 402, where a header of each data packet of the first set of data packets comprises packet information. The packet information is indicative of an association among the first set of data packets. Examples of the entity control circuitry 602 is similar to that of the control circuitry 428 (FIG. 4D). As already indicated above, the entity control circuit, or simply control circuit, in this and in the following embodiments may be a general-purpose processor running a dedicated software or a dedicated hardware circuitry. Similarly, examples of implementation of the transceiver 604 and the memory 606 is similar to that of the transceiver 430 and the memory 436, respectively of FIG. 4D.

In accordance with an embodiment, the entity control circuitry 602 is configured to append the uplink sequence number (SN) received from the source communication device 402 in a core network protocol-based header of each received data packet of the first set of data packets. The entity control circuitry 602 is further configured to communicate each received data packet of the first set of data packets having the core network protocol-based header that includes the appended uplink SN to the core network entity 506. The core network protocol-based header that includes the appended uplink SN is a modified core network protocol-based header that includes the appended uplink SN as an extension in a header structure of the core network protocol-based header. Optionally, the core network protocol-based header is a GTP-U header. The entity control circuitry 602 is further configured to set the retrieved uplink SN as a downlink SN in each received data packet of the plurality of data packets prior to a downlink transmission of the received data packets of the first set of data packets to the target communication device 404.

In accordance with an embodiment, the entity control circuitry 602 is configured to enable the multipath function based on an indicator in the header of each data packet of the first set of data packets or in a signalling message transmitted by the source communication device 402. The enablement of the multipath function includes storage of the packet information in each data packet of the first set of data packets received at the network entity 600 and reusing the packet information to further provide each received packet to the target communication device 404. The enablement of the multipath function further includes routing of each data packet of the first set of data packets having the packet information to a further network entity (such as the core network entity 506) that reuses the packet information to further provide each received packet to the target communication device 404 via the network entity 600, or another network entity.

Figure 7:
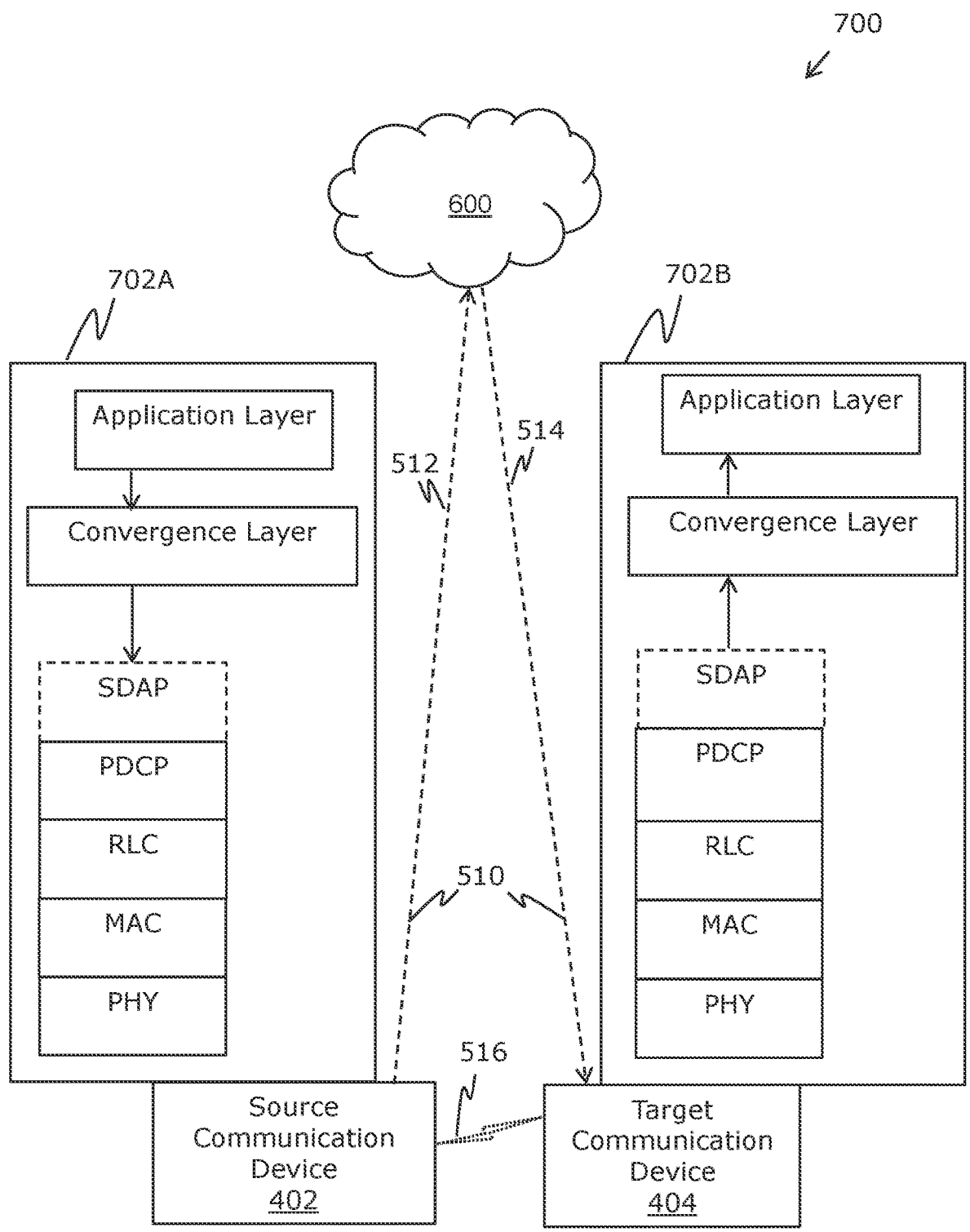
FIG. 7 is an illustration of an exemplary scenario for execution of multipath communication with network layers, in accordance with an embodiment of the present disclosure

FIG. 7 illustrates an exemplary scenario 700 to execute multipath communication with network layers, in accordance with an embodiment of the present disclosure. FIG. 7 is described in conjunction with elements from FIGS. 4A to 4E, 5, and 6. With reference to FIG. 7, there is shown a first plurality of network layers 702A (i.e. a user plane protocol stack) in the source communication device 402 and a second plurality of network layers 702B (i.e. a corresponding user plane protocol stack) in the target communication device 404. Each of the first plurality of network layers 702A and the second plurality of network layers 702B includes a physical (PHY) layer, a media access control (MAC) layer, a radio link control (RLC) layer, a PDCP layer, a convergence layer, and an application layer. In some embodiments, for example, in case of a 5G capable cellular network (i.e. a NR user plane protocol stack), a service data adaptation protocol (SDAP) layer is additionally provided in the source communication device 402 and the target communication device 404. Each network layer may also be referred to as a protocol layer of the user plane protocol stack.

In accordance with an embodiment, the method to execute multipath communication at the source communication device 402, the network entity 600, and the target communication device 404, is potentially implementable at different network layers. Based on a specific network layer (or protocol layer) in which the duplication or splitting of data takes place in the source communication device 402 (and consequently in the target communication device 404), different approaches (or solutions) may be used to execute the multipath communication. The different approaches include a communication device-based approach and a network-based approach.

In the communication device-based approach, the source communication device 402 is configured to generate a packet identifier (e.g. for a duplicated or a split packet) or a sequence number. The packet identifier (or the sequence number) is appended to the header (e.g. in the application layer or the convergence layer (such as a V2X layer in case of a vehicle)) of each data packet of a plurality of data packet that are to be provided to the target communication device 404. Optionally, the packet identifier (or the sequence number) is introduced in a header of each data packet at the communication layer, the application layer, or at the V2X layer (in case of vehicles) to reduce the impact on existing protocol layers of the user plane protocol stack.

Typically, a sequence number is assigned to each data packet at a transmitting end (i.e. the source communication device 402) in the PDCP layer before each data packet passes to a next layer (i.e. the RLC layer). This sequence number is used at the PDCP layer at the receiving end (i.e. the target communication device 404) to align data packets in a sequential order. However, currently, there is a problem in transmission of data packets via different paths (e.g. the cellular communication path 510 and the sidelink communication path 516) that employs different interfaces (e.g. a NR Uu interface and the NR PC5 interface). The problem is that the target communication device 404 may not able to compare (or match) the data packets received via a cellular interface (i.e. the Uu interface) with data packets received from a sidelink interface (i.e. the PC5 interface). In such cases, the downlink and the uplink sequence numbers of the data packets may be different or the packets may become disarranged (i.e. incorrectly ordered). Thus, in conventional methods and systems, the comparison of data packets communicated via the sidelink interface with the data packets sent via the cellular interface is not feasible. Thus, in the present disclosure, the packet information (i.e. the packet identifier for a split data packet or a duplicate data packet or a dedicated sequence number) is appended (or assigned) to the header of each data packet in upper layers (i.e. the application layer or the convergence layer (such as a V2X layer in case of a vehicle)). Such packet information is additional control information (e.g. additional packet identifier or additional sequence number other than the usual PDCP sequence number) that is retained in the header of each data packet of the plurality of data packets irrespective of the path (e.g. the cellular communication path 510 and the sidelink communication path 516) or different network nodes that the data packets traverses. The corresponding layer (e.g., the application layer or the convergence layer, and the like) at the target communication device 404 is utilized to compare and identify the packets based on the packet information (e.g. the additional packet identifier or the additional sequence number) in each data packet. The communication device-based approach does not have any impact on the network.

Optionally, in a case where the duplication mode is selected at the source communication device 402, the source communication device 402 is configured to generate a duplication identifier (ID), which is set for the duplicate data packets. The duplicate ID is stored (i.e. maintained) in the header of each data packet irrespective of the different radio access technologies, communication protocols, or radio links used in the two or more different paths traversed by the data packets. The convergence layer or the V2X layer (in case of V2V communication) may be used to generate the duplication ID at the source communication device 402 and to perform reordering or filtering of the received data packets at the corresponding convergence layer at the target communication device 404. The generation of such duplication ID allows unique identification of the duplicated data packets at the target communication device 404 regardless of the paths or intermediate protocols and network nodes followed by the data packets. Similarly, a packet ID may be set for the split data packets that remains in the data packet throughout the communication process for unique identification of the split data packets at the target communication device 404.

In the network-based approach, the network is enabled to maintain the packet information (e.g. the packet identifier or the sequence number) that is set at the source communication device 402 at a specific network layer (e.g. the PDCP, SDAP, or another network layer) across the end-to-end network. The network entity 600 (e.g. a base station) is configured to map an uplink sequence number to a downlink sequence number for each data packet obtained from the source communication device 402 based on the packet information. Optionally, the network-based approach has a network impact as it involves signalling to the network to maintain the packet information in header of each data packet throughout the end-to-end network.

Figure 8:
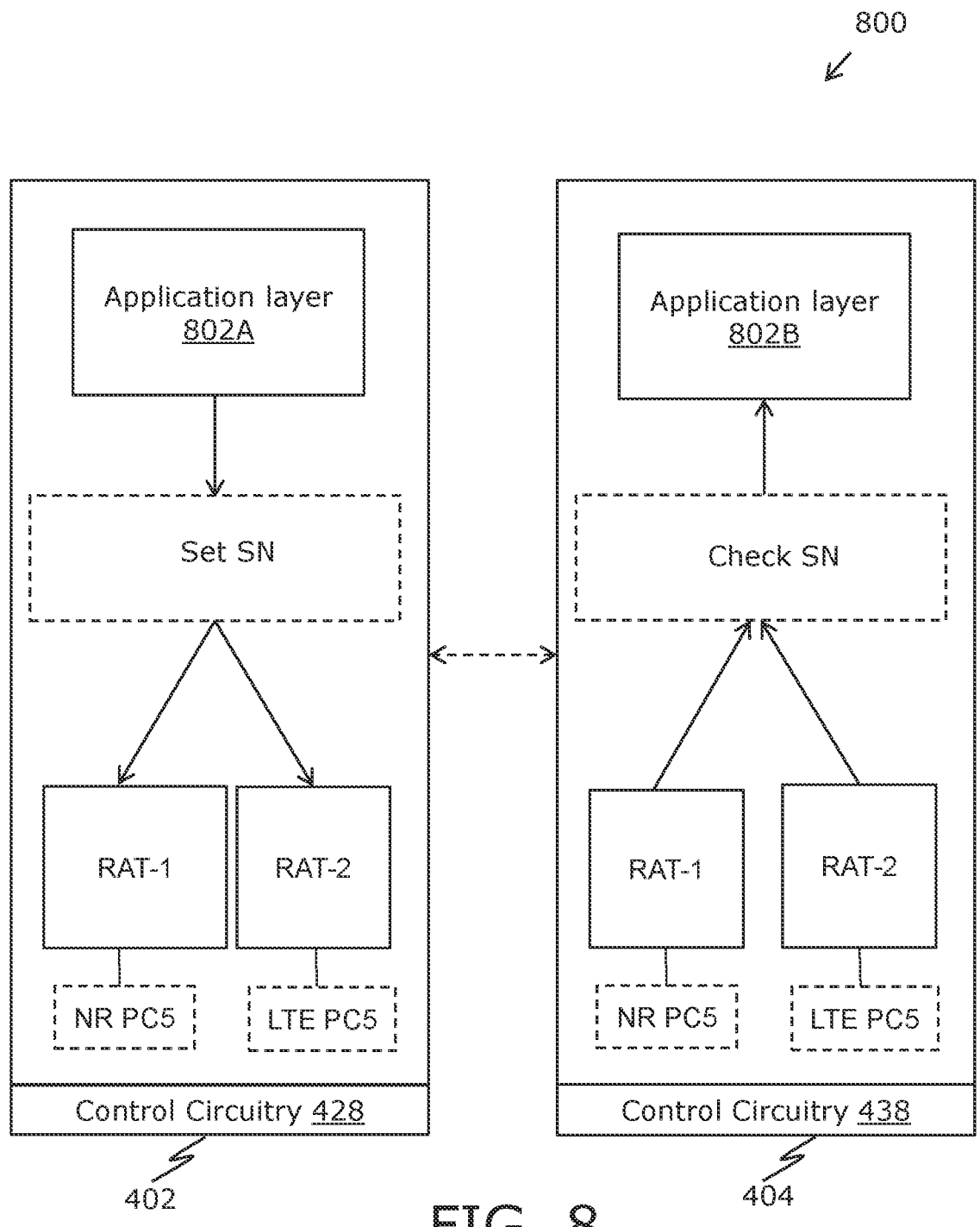
FIG. 8 is an illustration of an exemplary scenario for execution of multipath communication via different radio access technologies, in accordance with an embodiment of the present disclosure.

FIG. 8 illustrates an exemplary scenario 800 for execution of multipath communication using different radio access technologies, in accordance with an embodiment of the present disclosure. FIG. 8 is described in conjunction with elements from FIGS. 1 to 3, 4A to 4E, 5, 6, and 7. With reference to FIG. 8, there is shown an application layer 802A at the source communication device 402 and a corresponding application layer 802B at the target communication device 404. There is further shown the control circuitry 428 of the source communication device 402 and the control circuitry 438 of the target communication device 404.

In accordance with an embodiment, the control circuitry 428 of the source communication device 402 is configured to provide, to the target communication device 404, a first set of data packets from a plurality of data packets via a first path and a second set of data packets from the plurality of data packets via a second path. In this embodiment, the first path uses a first radio access technology (RAT-1) and the second path uses a second radio access technology (RAT-2) that is different than the RAT-1. In this case, the first path and the second path correspond to different device-to-device communication that employ different radio access technologies (e.g. NR PC5 interface and LTE PC5 interface as shown).

In an example, in a case where the split mode is selected at the source communication device 402, the control circuitry 428 is configured to set a sequence number (i.e. a dedicated sequence number) for each data packet at the application layer 802A, irrespective of the radio access technologies (i.e. RAT-1 or RAT-2) used for data communication. The RAT may be for example, LTE, 5G, and the like. The corresponding application layer 802B of the target communication device 404 is used to check the sequence number of each data packet obtained from the source communication device 402. The control circuitry 438 of the target communication device 404 is configured to reorder the plurality of data packets obtained in the first path and the second path (i.e. via different radio access technologies) in the split mode at the corresponding application layer 802B in accordance with the sequence number associated with each of the plurality of data packets. Alternatively, instead of the application layer 802A, the convergence layer, the V2X layer, or any other network layer outside the access stratum (AS) may be used to set the sequence number. The same network layer that is used to set the sequence number is then used at the target communication device 404 to check the sequence number and accordingly perform the reordering.

In another example, in a case where the duplication mode is selected at the source communication device 402, the control circuitry 428 is configured to set a sequence number (i.e. additional dedicated sequence number) for each data packet at the application layer 802A, irrespective of the radio access technologies (i.e. RAT-1 or RAT-2) used for data communication. Moreover, a duplicate ID is potentially assigned to duplicate data packets (e.g. the second set of data packets may have same payload as the first set of data packets) at the application layer 802A (or the convergence layer, or V2x layer in case of a vehicle). The control circuitry 438 of the target communication device 404 is configured to identify the duplicate data packets based on the duplication ID even if the plurality of data packets is obtained from the source communication device 402 via the different radio access technologies (i.e. via NR PC5 interface and LTE PC5 interface). The control circuitry 438 is configured to filter the duplicate data packets from the plurality of data packets received at the target communication device at the corresponding application layer 802B (or convergence layer, or the V2x layer) based on the packet information (e.g. the duplication ID and the dedicated sequence number).

Figure 9:
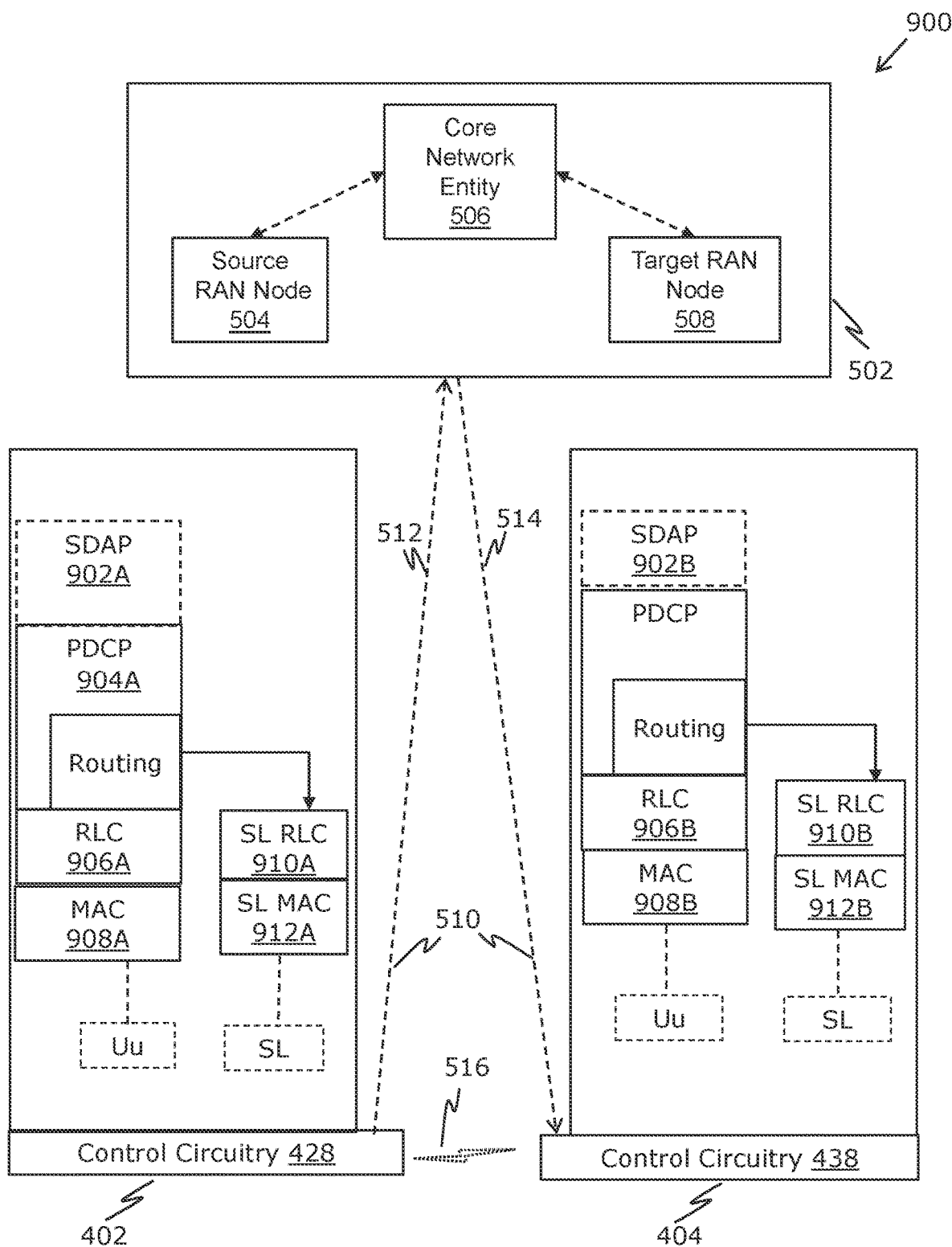
FIG. 9 is an illustration of an exemplary scenario for execution of multipath communication with packets duplication and splitting at a packet data convergence protocol (PDCP) layer, in accordance with an embodiment of the present disclosure.

FIG. 9 illustrates an exemplary scenario 900 for execution of multipath communication with packets duplication and splitting at a PDCP layer, in accordance with an embodiment of the present disclosure. FIG. 9 is described in conjunction with elements from FIGS. 4A to 4E, 5, 6, 7, and 8. With reference to FIG. 9, there is shown a SDAP layer 902A, a PDCP layer 904B, an RLC layer 906A, a MAC layer 908A of a user plane protocol stack in the source communication device 402 associated with a cellular interface (e.g. the Uu interface). Similarly, the corresponding network layers, such as a SDAP layer 902B, a PDCP layer 904B, a RLC layer 906B, and a MAC layer 908B that are associated with corresponding Uu interface is shown in the target communication device 404. In addition to the network layers that are associated with the Uu interface, network layers associated with the sidelink communication (such as sidelink (SL) RLC 910A and SL MAC 912A) are further shown in the source communication device 402 and the target communication device 404 (e.g. SL RLC 910B and SL MAC 912B). There is further shown the control circuitry 428 of the source communication device 402 and the control circuitry 438 of the target communication device 404.

In accordance with this embodiment, the data packets duplication or splitting is described with respect to the PDCP layer 904A instead of upper layers (such as the application layer, the convergence layer, or the V2X layer in case of a vehicle). However, it is to be understood that the data packets duplication or splitting may be implemented at different network layers, such as the SDAP layer 902A. In this embodiment, as the duplication is executed at the PDCP layer 904A of the source communication device 402, the data packets with same PDCP headers (i.e. same PDCP SN) are used for transmission via the cellular the communication path (e.g. via Uu interface) as well as the sidelink communication path (e.g. PC5 interface) in the duplication mode. Thus, the uplink PDCP SN is same as that of the sidelink PDCP SN. However, the uplink PDCP SN still needs to be same as that of the downlink PDCP SN for efficient and error free transmission of data from the source communication device 402 to the target communication device 404 in the multipath communication. Typically, in conventional systems, the PDCP SN of a given data packet in the uplink transmission may not be same with the PDCP SN of the same given packet in the downlink transmission. Thus, the source RAN node 504 is configured to map an uplink PDCP SN received from the source communication device 402 with a downlink PDCP SN for each data packet of the first set of data packets received at the source RAN node 504. The mapping of the uplink PDCP SN with the downlink PDCP SN is done in order to address incorrect ordering issues and allow the target communication device 404 to compare (or match) the data packets obtained via the cellular communication path 510 with the data packets obtained via the sidelink communication path 516. It will be appreciated that the mapping between the uplink PDCP SN with the corresponding downlink PDCP SN requires cooperation between the RAN (such as the source RAN node 504 and the target RAN node 508) and the core network entity 506 of the cellular network 502 for comparison of the data packets. The source RAN node 504 is further configured to append the uplink PDCP SN obtained from the source communication device 402 in a core network protocol-based header (e.g. the GTP-U header) of each received data packet of the first set of data packets. In an example, the source RAN node 504 appends the uplink PDCP SN in the GTP-U header of the data packets that are sent via, for example, N3 interface, for a specific service flow (QFI).

Notably, the GTP-U is responsible for carrying the data within the GPRS core network as well as between the RANs (such as the source RAN node 504 and the target RAN node 508) and the core network entity 506. The transported data in the form of data packets may be in several formats such as Internet Protocol version 4 (IPv4) format, Internet Protocol version 6 (IPv6) format, point-to-point protocol (PPP) format and the like. Moreover, the source RAN node 504 communicates each received data packet of the first set of data packets having the GTP-U header that includes the appended uplink PDCP SN to the core network entity 506. The GTP-U header that includes the appended uplink PDCP SN is a modified GTP-U header that includes the appended uplink PDCP SN as an extension in a header structure of the GTP-U header. An example of the GTP-U header is described in FIG. 10. The uplink PDCP SN is forwarded via the core network entity 506 entities of the first path 406. Further, the user plane function (UPF) node maintains the PDCP SN in the GTP-U header that are transmitted over the N3 interface or an N9 interface. The GTP-U header is thus a modified GTP-U header that includes at least the packet information, for example, the uplink PDCP SN.

FIG. 10 illustrates an exemplary structure of a GPRS Tunnelling Protocol User Plane (GTP-U) header 1000, in accordance with an embodiment of the present disclosure. FIG. 10 is described in conjunction with elements from FIGS. 1 to 3, 4A to 4E, and 5 to 9. With reference to FIG. 10, there is shown an example of a core network protocol-based header, such as the GTP-U header 1000.

The GTP-U header 1000 includes various fields in accordance to the 3GPP specification, such as "Message type" that is reserved for a type of data present in a data packet. For example, the message type may be text, an image, an audio, or a video. The GTP-U header 1000 may further includes fields, such as length (i.e. measured in terms of number of bits) of the data packet, "Tunnel endpoint identifier", "Sequence number" and the like. Moreover, the GTP-U header 1000 further includes a new extension header type field 1002.

In accordance with an exemplary implementation, the new extension header type field 1002 is used to include information, such as duplication mode or the split mode associated with the data packets that are potentially sent via N3 interface between a RAN node (such as the source RAN node 504) and a user plane function (UPF) or via N9 interface between two two UPFs (e.g. intra-Public Land Mobile Network (PLMN) interface or inter-PLMN interface). The new extension header type field 1002 is enhanced or extended) to include, for instance, uplink PDCP SN and the Quality of service Flow Identifier (QFI). Optionally, in another implementation, the uplink PDCP SN is appended in a 5G encapsulation header, in a 5G cellular network on N3 (and/or N9) interfaces to reduce changes to the header of a data packet across the e2e network.

Activation of multipath function: there are two options for the activation of the multipath function, for example, in the network-based approach (or solution). The first option is activation on a session level and the second option is activation on per data packet basis. In the first option, a radio access network node (e.g. a base station, such as a gNB) and a user plane function (UPF) are signalled at protocol data unit (PDU) session establishment or modification to provide a specific treatment to uplink and downlink data packets by various network nodes and interfaces on the session level. The first option is described in details, for example, in FIG. 11. In the second option, the multipath function is activated based on an indicator in the header of each data packet of the first set of data packets, to provide a specific treatment to uplink and downlink data packets by the various network nodes and interfaces on per data packet basis. The activation of the multipath function based on the indicator in the header of each data packet is described in details, for example, in FIG. 12.

Figure 11:
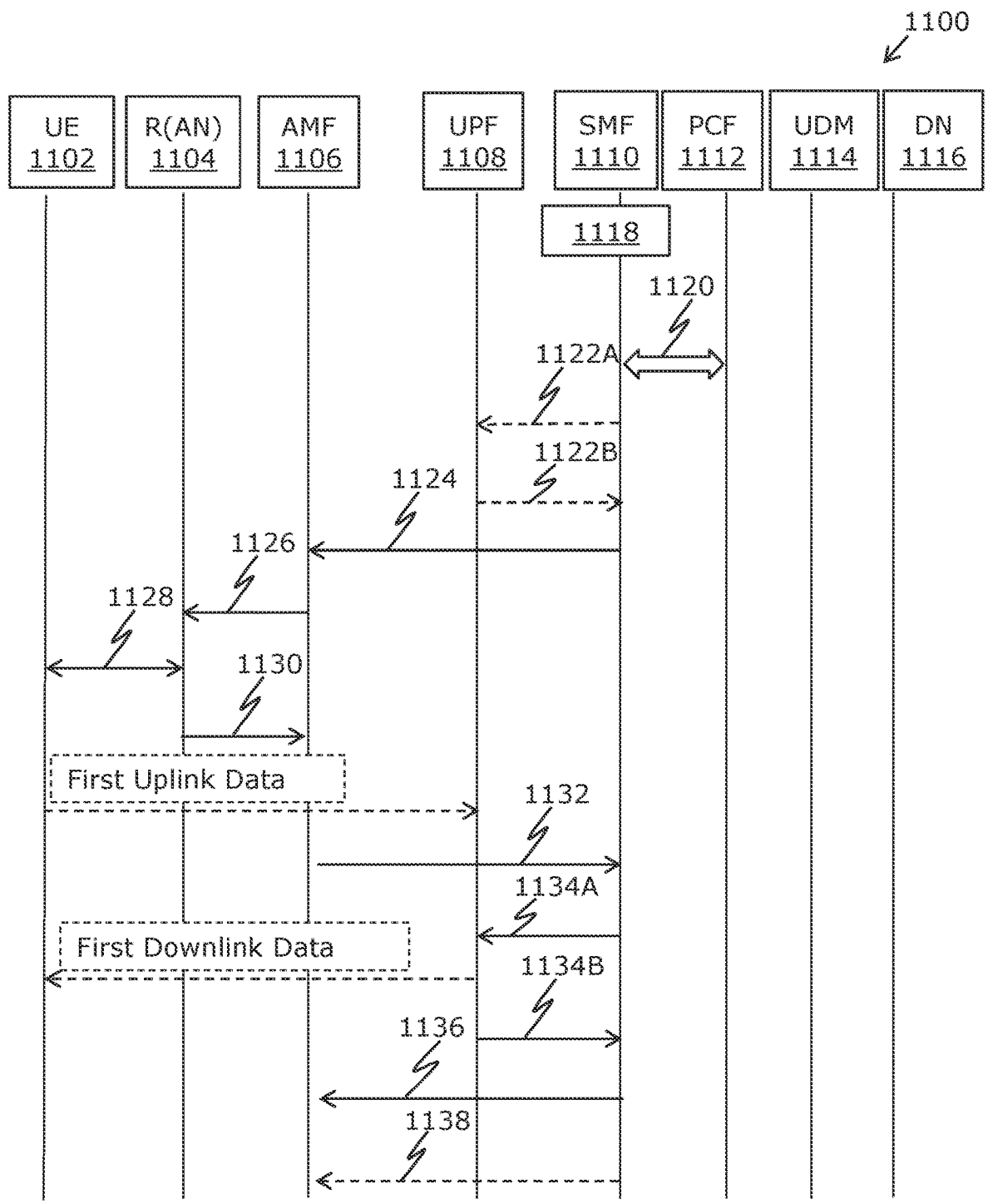
FIG. 11 is a sequence diagram that illustrates a portion of a procedure of protocol data unit (PDU) session establishment, in accordance with an embodiment of the present disclosure.

FIG. 11 is a sequence diagram 1100 that illustrates a portion of a procedure of protocol data unit (PDU) session establishment, in accordance with an embodiment of the present disclosure. FIG. 11 is described in conjunction with elements from FIGS. 1, 2, 3, 4A to 4E, 5, 6, 7, 8, 9, and 10. With reference to FIG. 11, there is shown a user equipment (UE) 1102, a radio access network (R)AN 1104, an access and mobility management function (AMF) 1106, a user plane function (UPF) 1108, a session management function (SMF) 1110, a policy control function (PCF) 1112, a unified data management (UDM) 1114, and a data network 1116.

The UE 1102 corresponds to the source communication device 402. The RAN 1104 corresponds to the source RAN node 504 (FIG. 5).

The sequence diagram 1100 depicts a portion of a procedure of PDU session establishment that is compliant to the 3GPP specification. In an exemplary implementation, some operations in the sequence diagram 1100 that involve SMF 1110 signalling to RAN 1104 and UPF 1108 are potentially enhanced (or extended) to enable the multipath function at one or more network entities based on an indicator in a signalling message transmitted by the source communication device 402 (e.g. by control plane signalling). For example, the SMF 1110 signalling to the RAN 1104 (e.g. steps 1124 and 1126) and the UPF 1108 (e.g. step 1134A) are potentially enhanced (i.e. extended) to enable the uplink sequence number received in a specified network layer (e.g. the PDCP layer) from the source communication device 402 to be the same as the downlink sequence number in the specified network layer. specifically, the SMF 1110 signalling to RAN 1104 is potentially enhanced (or extended) to enable transfer of the sequence number received in a specific network layer (e.g. PDCP SN) in N3 in an uplink data packet, and further enable use of the uplink SN in the specified network layer (e.g. downlink PDCP SN) for the downlink packet. Moreover, in the sequence diagram 1100, the signalling of SMF 1110 to UPF 1108 is potentially extended to enable the UPF 1108 to forward the received data packets that includes the modified core network protocol-based header (e.g. the modified GTP-U header) that includes the appended uplink sequence number to appropriate QFIs in the downlink PDU session.

In the sequence diagram 1100, the procedure of PDU session establishment (or modification) is described from UPF 1108 selection by the SMF 1110 at a step 1118. It is to be understood by a person of ordinary skill in the art that there are various steps to be potentially performed before the step 1118. For example, PDU session establishment request, SMF selection by the AMF, signalling from AMF to SMF (i.e. in the form of a Nsmf_PDUSession_CreateSMContext Request), retrieval of session management subscription data by SMF (if not available), signalling from SMF to AMF (i.e. in the form of a Nsmf_PDUSession_CreateSMContext Response), and the like (e.g. as specified in 3GPP-23.502).

At step 1120, the SMF 1110 initiates a session management policy association modification between the SMF 1110 and the PCF 1112. At step 1122A, a N4 session establishment/modification request is communicated from the SMF 1110 to the UPF 1108. At step 1122B, a N4 session establishment or modification response is communicated from the UPF 1108 to the SMF 1110. At step 1124, a Namf_communication_N1N2message transfer is executed from the SMF 1110 to the AMF 1106. In a case where N2 session management (SM) information is not included in the step 1124, then the following step 1130 to 1134B and step 1136 are potentially omitted. Beneficially, in an exemplary implementation of the present disclosure, the Namf_communication_N1N2 message transfer is enhanced and extended to enable transfer of the sequence number received in a specific network layer (e.g. PDCP SN) in N3 in an uplink data packet. At step 1126, a N2 PDU session request is communicated from AMF 1106 to RAN 1104. In the exemplary implementation, the N2 PDU session request is also enhanced and extended to enable use of the uplink SN in the specified network layer (e.g. downlink PDCP SN) for the downlink packet (in the downlink transmission). At step 1128, the N2 PDU session request is accepted. At step 1130, a N2 PDU session request acknowledgement is communication from the RAN 1104 to the AMF 1106. At step 1132, Nsmf_PDUSession_updateSMContext request is communicated from the AMF 1106 to the SMF 1110. At step 1134A, a N4 session modification request is communicated from the SMF 1110 to the UPF 1108. In the exemplary implementation, the signalling of the SMF 1110 to UPF 1108 is potentially enhanced and extended to enable the UPF 1108 to forward the received data packets that includes the modified core network protocol-based header (e.g. the modified GTP-U header) that includes the appended uplink sequence number to appropriate QFIs in the downlink PDU session. The N4 session modification request is used to enable the UPF 1108 to forward the received data packets that includes the modified core network protocol-based header (e.g. the modified GTP-U header) that includes the appended uplink sequence number to appropriate QFIs in the downlink PDU session. At step 1134B, a N4 session modification response is received by the SMF 1110. At step 1136, a Nsmf_PDUSession_updateSMContext response is communicated from the SMF 1110 to the AMF 1106. At step 1138, a Nsmf_PDUSession_SMContext_status_notify service is executed from the SMF 1110 to the AMF 1106.

In the conventional systems and methods, and existing standards, there are various issues, for example, different packet identifiers for different protocols and different protocol layers and network entities (e.g. RAN part, core network part etc). In a first example, IPv4 has an identifier (ID) (i.e. IP ID) that is enabled for packets fragmentation, but such IP ID is not included in IPv6. In a second example, QoS Flow Identifier (QFI) allows a granularity in QoS differentiation in the PDU Session. Usually, a QoS Flow ID (QFI) is used to identify a QoS Flow in a 5G (NR) capable device. Typically, a user plane traffic with the same QFI within a PDU session receives the same traffic forwarding treatment (e.g. scheduling, admission threshold, and the like). The QFI is carried in an encapsulation header on N3 (and N9) interface i.e. without any changes to the packet header across the e2e network. This QFI is used for all PDU session types. The QFI is unique within a PDU Session. The QFI may be dynamically assigned or may be equal to the 5QI (i.e. 5G QoS characteristics). However, in such conventional methods and systems, there is no per packet treatment or handling. In a third example, currently a PDCP SN is available only at RAN (e.g. the RAN 1104) from the UE 1102 to a base station in uplink transmission, whereas another PDCP SN may be set in the downlink transmission from the base station to the user equipment (i.e. a wireless communication device). This depends on packets disarrangement, path followed by data packets, and the like. In a fourth example, core network packet identifier (in N3) includes in the user plane, an increasing SN for transport (T)-PDUs is transmitted via GTP-U tunnels (GTP-U header), when transmission order of data packets must be preserved. This field is an optional field in G-PDUs that consists of a GTP-U header plus a T-PDU within the GPRS backbone network. However, in the conventional methods and systems, the focus is on the one part of N3 transmission (i.e. from RAN to UPF, or from UPF to RAN) and there is no direct link/correlation with RAN packet IDs. Moreover, in conventional methods and devices, there is no end-to-end tracking, mapping, or correlation of (R)AN 1104 and core network packets. Thus, the various steps (e.g. steps 1122A to 1128) and step 1134A of the sequence diagram 1100 are enhanced and extended to enable the multipath function, and solve the issues associated with the conventional methods and systems as described above.

Figure 12:
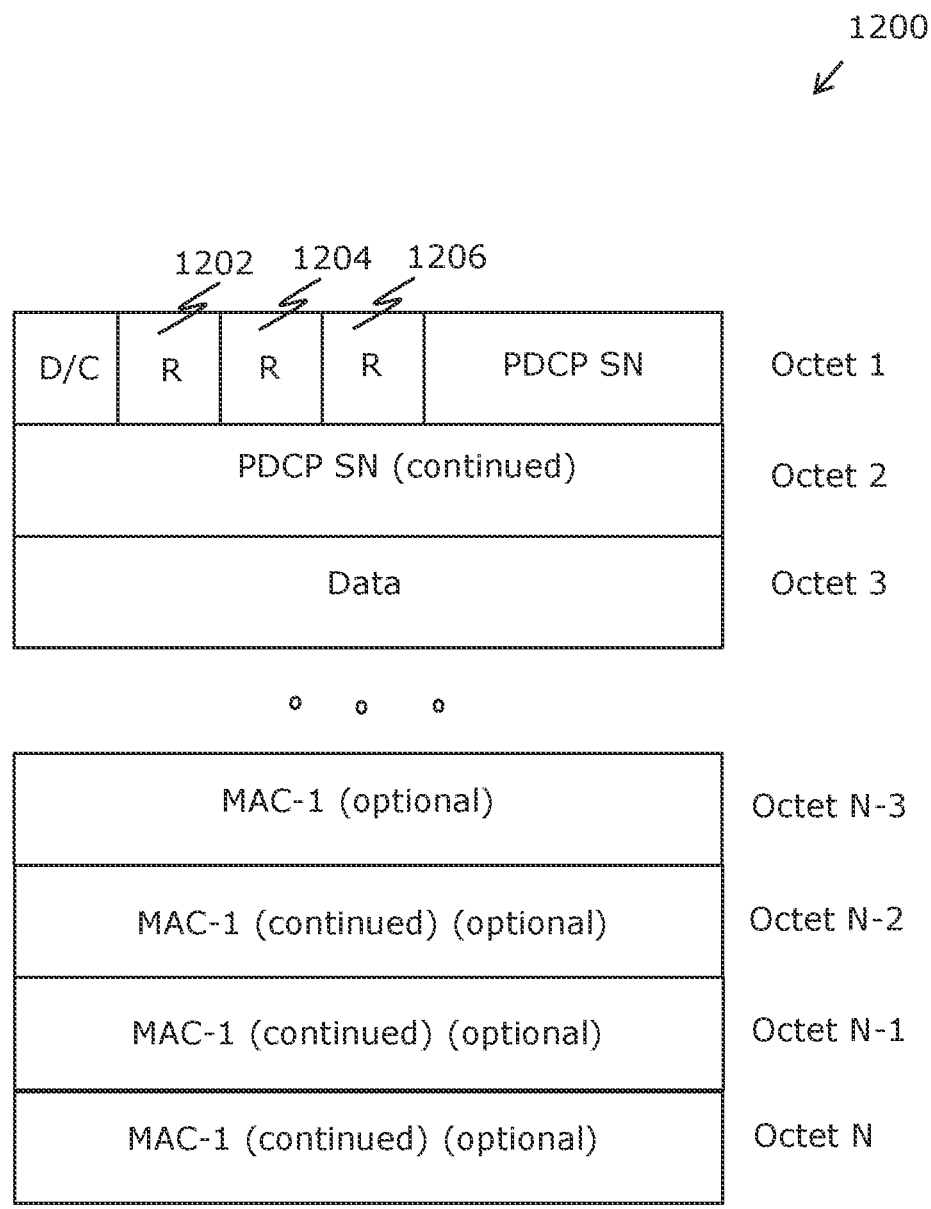
FIG. 12 is an illustration of an exemplary indicator in a header of a data packet, in accordance with an embodiment of the present disclosure.

FIG. 12 illustrates an exemplary indicator in a header of a data packet, in accordance with an embodiment of the present disclosure. FIG. 12 is described in conjunction with elements from FIGS. 1, 2, 3, 4A to 4E, and 5 to 11. With reference to FIG. 12, there is shown a PDCP header structure 1200. The PDCP header structure 1200 includes a plurality of fields, such as a plurality of reserve fields 1202, 1204, and 1206, and fields for MAC address of a data packet.

In accordance with an embodiment, any one or more reserve fields of the plurality of reserve fields 1202, 1204, and 1206 is potentially used as an indicator (e.g. a flag) in order to enable the RAN mapping of the uplink PDCP SN with the downlink PDCP SN for a data packet. In an example, the reserve field 1202 may be set to a specific bit value (e.g. bit value "1") from the binary bit values (0 or 1) by the source communication device 402 to signal to the network entity 600 (e.g. the source RAN node 504) to activate the multipath function to enable mapping of the uplink PDCP SN with the downlink PDCP SN. Thus, the source RAN node 504 is configured to map the uplink PDCP SN with the downlink PDCP SN based on the indicator (i.e. a bit value of "1" in the reserve filed 1202 in this example). In another example, the source communication device 402 is further configured to set the reserve field 1204 in the PDCP header structure 1200 for an uplink data packet as an indication of the selection of the duplication mode at the source communication device 402. Thus, based on such indication, the target communication device 404 is configured to determine that the plurality of data packets obtained from the source communication device 402 via two or more different paths includes duplicate data packets. Beneficially, the use of the plurality of reserve fields 1202, 1204, and 1206 as an indicator allows per packet treatment of the uplink and downlink data packets instead of a pre flow treatment, without the need to modify existing PDCP header to minimize cost of implementation.

Figure 13:
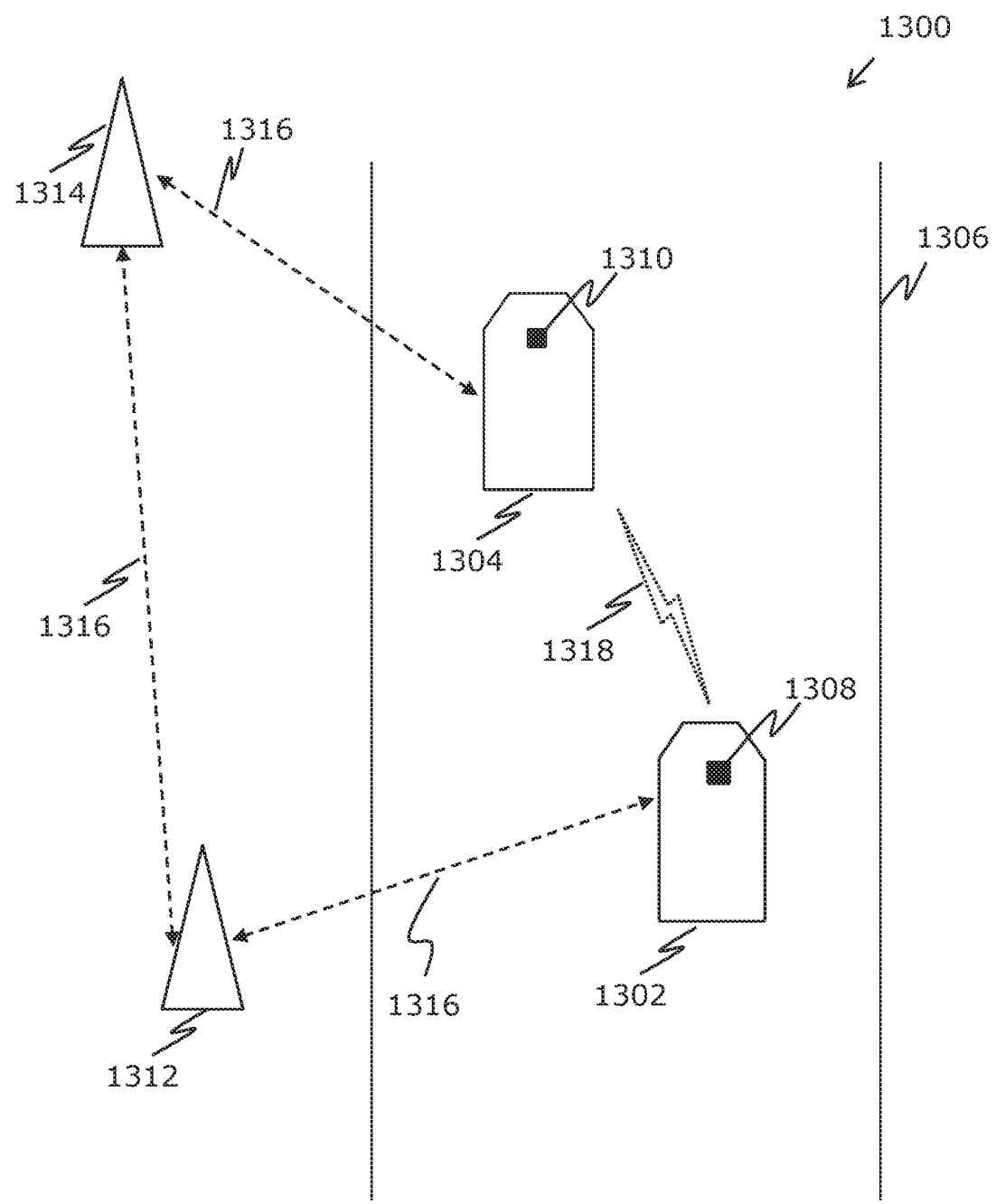
FIG. 13 is an illustration of an exemplary scenario that depicts vehicle-to-vehicle (V2V) multipath communication, in accordance with an embodiment of the present disclosure.

FIG. 13 illustrates an exemplary scenario 1300 to execute vehicle-to-vehicle (V2V) multipath communication, in accordance with an embodiment of the present disclosure. FIG. 13 is described in conjunction with elements from FIGS. 1, 2, 3, 4A to 4E, and 5 to 12. With reference to FIG. 13, there is shown the exemplary scenario 1300 that includes a source vehicle 1302 and a target vehicle 1304 moving on a road portion 1306. The source vehicle 1302 includes an electronic control unit (ECU) 1308 and the target vehicle 1304 includes an ECU 1310. There is further shown a source base station 1312, a target base station 1314, a cellular communication path 1316, and a sidelink communication path 1318.

In accordance with the exemplary scenario 1300, the source vehicle 1302 and the target vehicle 1304 correspond to the source communication device 402 and the target communication device 404, respectively (FIG. 4A). The source base station 1312 and the target base station 1314 correspond to the source RAN node 504 and the target RAN node 508 respectively (FIG. 5). The source vehicle 1302 may be within a communication range to establish a D2D communication with each other. A user of the source vehicle 1302 may want to communicate data to the target vehicle 1304.

In accordance with an embodiment, the ECU 1308 of the source vehicle 1302 is configured to select a duplication mode or a split mode to communicate a plurality of data packets to the target vehicle 1304 via the cellular communication path 1316 and the sidelink communication path 1318. The ECU 1308 of the source vehicle 1302 is configured to provide, to the target vehicle 1304, a first set of data packets from the plurality of data packets via the cellular communication path 1316 and a second set of data packets from the plurality of data packets via the sidelink communication path 1318. In other words, a plurality of V2X packets are communicated through different radio access technologies, radio links, interfaces, or communication protocols to improve the QoS of the communication between two vehicles, so as to increase reliability of V2V communication. A header of each data packet includes packet information indicative of an association among the plurality of data packets. The first set of data packets traverses through various network entities, such as the source base station 1312, and a neighbouring base station, such as the target base station 1314. In some cases, the first set of data packet may also traverse through a core network entity.

In accordance with an embodiment, the source base station 1312 is configured to obtain the first set of data packets from the source vehicle 1302. The header of each data packet of the first set of data packets comprises packet information. The source base station 1312 is configured to map an uplink sequence number received in a specified network layer (e.g. PDCP layer or other network layer) to a downlink sequence number for each data packet of the received first set of data packets based on the packet information. The source base station 1312 is configured to provide each received data packet of the first set of data packets that includes the packet information to the target vehicle 1304 in a case where the target vehicle is within a communication range of the source base station 1312 at the time of communication. In a case where the target vehicle 1304 is beyond the communication range of the source base station 1312, the source base station 1312 is configured to provide each received data packet of the first set of data packets that includes the packet information to a neighbouring base station, such as the target base station 1314.

In accordance with an embodiment, the ECU 1310 of the target vehicle 1304 is configured to identify the first set of data packets received via the cellular communication path 1316 and the second set of data packets received via the sidelink communication path 1318 based on the packet information. As the packet information in the header of each data packet do not change irrespective of different radio access technologies, communication protocols, or radio links used in the two or more different paths (i.e. the cellular communication path 1316 and the sidelink communication path 1318 in this case), the quality-of-service (QoS) of data communication between the source vehicle 1302 and the target vehicle 1304 is improved. For example, in a case where the plurality of data packets obtained via two or more different paths includes different data packets having different payload (i.e. in the split mode), data-throughput is increased and latency in data communication is reduced. Further, in a case where the plurality of data packets obtained via two or more different paths includes duplicate data packets having a copy of same payload, reliability of data communication between the source vehicle 1302 and the target vehicle 1304 is significantly improved. Beneficially, such V2V multipath communication between the source vehicle 1302 and the target vehicle 1304 is useful in improvement of road safety by providing an efficient and reliable mechanism to share alerts and other data (such as text, image, audio, or video) concurrently via two or more different paths between the source vehicle 1302 and the target vehicle 1304.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

What is claimed is:

1. A method for executing multipath communication at a target communication device, the method comprising:
   obtaining, from a source communication device, a plurality of data packets via two or more different paths, wherein:
   a header of each data packet of the plurality of data packets comprises packet information,
   the packet information is indicative of an association among the plurality of data packets,
   the packet information in each data packet at the source communication device is the same as the packet information in each data packet at the target communication device irrespective of different radio access technologies, communication protocols, or radio links used in the two or more different paths, and
   the plurality of data packets comprises different data packets having different payload or duplicate data packets having a copy of same payload;
   identifying a first set of data packets from the plurality of data packets received via a first path of the two or more different paths and a second set of data packets from the plurality of data packets received via a second path of the two or more different paths based on the packet information; and
   mapping an uplink sequence number to a downlink sequence number for each data packet of the first set of data packets based on the packet information, wherein the uplink sequence number is received in a specified network layer from the source communication device, wherein the uplink sequence number is mapped to the downlink sequence number in the specified network layer, and wherein the specified network layer is a service adaptation protocol layer.

2. The method according to claim 1, wherein at least one of the first path or the second path corresponds to a device-to-device communication between the source communication device and the target communication device.

3. The method according to claim 1, wherein the first path of the two or more different paths is a cellular communication path, and wherein the second path of the two or more different paths is a sidelink communication path that corresponds to a device-to-device communication, and wherein the source communication device and the target communication device each is at least one of: a vehicle, an electronic device used in the vehicle, or a portable electronic device.

4. The method according to claim 1, the method further comprising filtering, by the target communication device, duplicate data packets from the plurality of data packets received at the target communication device based on the packet information.

5. The method according to claim 1, the method further comprising reordering, by the target communication device, the plurality of data packets by a sequence number associated with each of the plurality of data packets based on the packet information, wherein the plurality of data packets comprises different data packets obtained via the first path and the second path in a split mode.

6. A c non-transitory computer-readable storage medium having computer-readable instructions stored thereon, the computer-readable instructions being executable by a computerised device comprising processing hardware to execute the method as claimed in claim 1.

7. A method for executing multipath communication at a source communication device, the method comprising:
providing, to a target communication device, a first set of data packets from a plurality of data packets via a first path and a second set of data packets from the plurality of data packets via a second path, wherein a header of each data packet of the plurality of data packets comprises packet information indicative of an association among the plurality of data packets,
wherein the plurality of data packets comprises different data packets having different payload or duplicate data packets having a copy of a same payload; and
mapping an uplink sequence number to a downlink sequence number for each data packet of the first set of data packets based on the packet information, wherein the uplink sequence number is received in a specified network layer from the source communication device, wherein the uplink sequence number is mapped to the downlink sequence number in the specified network layer, and wherein the specified network layer is a service adaptation protocol layer.

8. The method of claim 7, wherein at least one of the first path or the second path corresponds to a device-to-device communication between the source communication device and the target communication device, and wherein the packet information in each data packet at the source communication device is the same as the packet information in each data packet at the target communication device irrespective of different radio access technologies, communication protocols, or radio links used in the two or more different paths.

9. The method according to claim 7, the method further comprising selecting, by the source communication device, a duplication mode or a split mode to communicate the plurality of data packets to the target communication device via two or more different paths, wherein the selection of the duplication mode or the split mode occurs before a start of a data session or during a data session.

10. The method according to claim 9, the method further comprising communicating, by the source communication device, the first set of data packets via the first path to a network entity in an uplink transmission and the second set of data packets via the second path to the target communication device as duplicate data packets based on the selection of the duplication mode, wherein at least a payload of the first set of data packets is same as the payload of the second set of data packets in the duplication mode.

11. The method according to claim 9, the method further comprising communicating, by the source communication device, the first set of data packets via the first path to a network entity in an uplink transmission and the second set of data packets via the second path to the target communication device, wherein a payload of the first set of data packets is different from a payload of the second set of data packets in the split mode.

12. The method according to claim 7, wherein the header of each data packet of the plurality of data packets or a signaling message transmitted by the source communication device to at least one of a network entity or the target communication device upon establishment or update of the data session comprises an indicator, and
wherein the indicator indicates enablement of a multipath function at the network entity or at the target communication device.

13. A non-transitory computer-readable storage medium having computer-readable instructions stored thereon, the computer-readable instructions being executable by a computerised device comprising processing hardware to execute the method as claimed in claim 7.

14. A method for executing multipath communication at a network entity, the method comprising:
obtaining, from a source communication device, a first set of data packets, wherein a header of each data packet of the first set of data packets comprises packet information, wherein the packet information is indicative of an association among the first set of data packets;
mapping an uplink sequence number to a downlink sequence number for each data packet of the first set of data packets based on the packet information, wherein the uplink sequence number is received in a specified network layer from the source communication device, wherein the uplink sequence number is mapped to the downlink sequence number in the specified network layer, and wherein the specified network layer is a service adaptation protocol layer; and
providing each received data packet of the first set of data packets that comprises the packet information to at least one of a target communication device or a further network entity based on the mapped uplink sequence number to the downlink sequence number.

15. The method according to claim 14, the method further comprising:
appending, by the network entity, the uplink sequence number received from the source communication device in a core network protocol-based header of each received data packet of the first set of data packets; and
communicating, by the network entity, each received data packet of the first set of data packets having the core network protocol-based header that includes the appended uplink sequence number to a core network entity, wherein the core network protocol-based header that includes the appended uplink sequence number is a modified core network protocol-based header that comprises the appended uplink sequence number as an extension in a header structure of the core network protocol-based header.

16. The method according to claim 15, wherein the core network protocol-based header is a general packet radio service tunneling protocol user plane header.

17. The method according to claim 14, the method further comprising setting, by the network entity, the retrieved uplink sequence number as the downlink sequence number in each received data packet of the plurality of data packets prior to a downlink transmission of the received data packets of the first set of data packets to the target communication device.

18. The method according to claim 14, the method further comprising enabling, by the network entity, a multipath function based on an indicator in the header of each data packet of the first set of data packets or in a signaling message transmitted by the source communication device, wherein the enablement of the multipath function comprises:
storing the packet information in each data packet of the first set of data packets received at the network entity and reusing the packet information to further provide each received packet to the target communication device; or
outing each data packet of the first set of data packets having the packet information to a further network entity that reuses the packet information to further provide each received packet to the target communication device via the network entity, or another network entity.

19. A non-transitory computer-readable storage medium having computer-readable instructions stored thereon, the computer-readable instructions being executable by a computerised device comprising processing hardware to execute the method as claimed in claim 14.

20. A target communication device for executing a multipath communication, the target communication device comprising:
a control circuitry that is configured to:
obtain, from a source communication device, a plurality of data packets via two or more different paths, wherein:
a header of each data packet of the plurality of data packets comprises packet information,
the packet information is indicative of an association among the plurality of data packets,
the packet information in each data packet at the source communication device is the same as the packet information in each data packet at the target communication device irrespective of different radio access technologies, communication protocols, or radio links used in the two or more different paths, and
the plurality of data packets comprises different data packets having different payload or duplicate data packets having a copy of same payload;
identify a first set of data packets from the plurality of data packets received via a first path of the two or more different paths and a second set of data packets from the plurality of data packets received via a second path of the two or more different paths based on the packet information; and
mapping an uplink sequence number to a downlink sequence number for each data packet of the first set of data packets based on the packet information, wherein the uplink sequence number is received in a specified network layer from the source communication device, wherein the uplink sequence number is mapped to the downlink sequence number in the specified network layer, and wherein the specified network layer is a service adaptation protocol layer.

21. A source communication device for executing a multipath communication, the source communication device comprising:
a control circuitry that is configured to:
provide, to a target communication device, a first set of data packets from a plurality of data packets via a first path and a second set of data packets from the plurality of data packets via a second path,
wherein a header of each data packet comprises packet information indicative of an association among the plurality of data packets,
wherein the plurality of data packets comprises different data packets having different payload or duplicate data packets having a copy of same payload; and
mapping an uplink sequence number to a downlink sequence number for each data packet of the first set of data packets based on the packet information, wherein the uplink sequence number is received in a specified network layer from the source communication device, wherein the uplink sequence number is mapped to the downlink sequence number in the specified network layer, and wherein the specified network layer is a service adaptation protocol layer.

22. A network entity for executing a multipath communication, the network entity comprising:
an entity control circuitry that is configured to:
obtain, from a source communication device, a first set of data packets, wherein a header of each data packet of the first set of data packets comprises packet information, wherein the packet information is indicative of an association among the first set of data packets;
map an uplink sequence number to a downlink sequence number for each data packet of the first set of data packets based on the packet information, wherein the uplink sequence number is received in a specified network layer from the source communication device, wherein the uplink sequence number is mapped to the downlink sequence number in the specified network layer, and wherein the specified network layer is a service adaptation protocol layer; and
provide each received data packet of the first set of data packets that comprises the packet information to at least one of a target communication device or a further network entity based on the mapped uplink sequence number to the downlink sequence number.

* * * * *